United States Patent
Fujimaki et al.

[11] Patent Number: 5,190,839
[45] Date of Patent: Mar. 2, 1993

[54] ELECTROPHOTOGRAPHIC PHOTORECEPTOR

[75] Inventors: Yoshihide Fujimaki; Hajime Tadokoro; Yasuhiro Oda; Hiroshi Yoshioka, all of Hachioji, Japan

[73] Assignee: Konica Corporation, Tokyo, Japan

[21] Appl. No.: 546,379

[22] Filed: Jun. 29, 1990

[30] Foreign Application Priority Data

Jul. 4, 1988 [JP] Japan .................................. 1-73388
Jul. 4, 1989 [JP] Japan .................................. 1-73382

[51] Int. Cl.$^5$ .......................... G03G 5/14; G03G 5/06
[52] U.S. Cl. ....................................... 430/78; 430/72; 540/141
[58] Field of Search ................. 430/78, 72; 540/141

[56] References Cited

U.S. PATENT DOCUMENTS

| 4,631,242 | 12/1986 | Emoto et al. | 430/78 |
| 4,728,592 | 3/1988 | Ohaku | 430/59 |
| 4,898,799 | 2/1990 | Fujiimaki et al. | 430/59 |
| 4,994,339 | 2/1991 | Kinoshita et al. | 430/78 |

FOREIGN PATENT DOCUMENTS 2205659 12/1988 United Kingdom .

Primary Examiner—Marion E. Mc Camish
Assistant Examiner—Christopher D. RoDee
Attorney, Agent, or Firm—Jordan B. Bierman

[57] ABSTRACT

An electrophotographic photoreceptor is disclosed. The photoreceptor contains in a light sensitive layer thereof a titanylphthalocyanine having specific crystalline characteristics as defined in the specification and a polycyclic quinone pigment or a bisazo pigment as defined in the specification. The photoreceptor has a high sensitivity over a broad wavelength region, especially near-infrared range. It is suitably used for a laser printer.

6 Claims, 7 Drawing Sheets

ELECTROPHOTOGRAPHIC PHOTORECEPTOR

FIELD OF THE INVENTION

The present invention relates to a photoreceptor, more specifically to a electrophotographic photoreceptor.

BACKGROUND OF THE INVENTION

Recently, a photoreceptor consisting of an organic photoconductor (OPC) has been attracting a great deal of attention due to its various advantages over a photoreceptor of an inorganic photoconductor. As compared with a photoreceptor of an inorganic photoconductor, an OPC-based photoreceptor is less toxic, more flexible, light in weight, and excellent in film-forming property and cost performance.

Among these photoreceptors, those in which functions of charge-generation and charge-transfer are separated (function-separated photoreceptors) are especially advantageous due to the possibility of separate designing of each function, which permits a wider range of choice in the designing of a photoreceptor, and then leads to the production of a photoreceptor improved in electrophotographic properties, sensitivity, repeatability and mechanical strength.

Such photoreceptors are widely employed in electrophotographic duplicators, printers, and the like. In the field of duplicators, photoreceptors having a sensitivity to visible rays were already developed. On the other hand, a photoreceptor for a semiconductor laser printer which is used in a computer terminal must be highly sensitive to near-infrared rays.

Meanwhile, efforts have been made to develop a semiconductor laser printer capable of duplicating, in which duplication is performed by irradiating a photoreceptor with white light.

In such device, a photoreceptor must be highly sensitive to near-infrared rays for the printing function, and also to visible rays for the duplicating function. That is, a photoreceptor applicable to such device has to exhibit an excellent sensitivity to from visible to near-infrared rays. Such photoreceptor has not yet been developed.

A photoreceptor containing a bisazo compound, which is described in Japanese Patent Publication Open to Public Inspection (hereinafter referred to as Japanese Patent O.P.I. Publication) Nos. 37543/1972, 22834/1980, 79632/1979 and 116040/1981, cannot be applied to the semiconductor laser printer, since it is less sensitive to light of a longer wavelength, though having a higher sensitivity in the shorter and medium wavelength regions.

A gallium-aluminum-arsenite (Ga-Al-As) type light-emitting element which is widely employed as a light source has an oscillation wavelength of not less than 750 nm. The examples of a photoreceptor having a higher sensitivity to such longer wavelengths include X, $\tau$, $\tau'$, $\eta$ or $\eta'$-type nonmetallic phthalocyanine compounds described in Japanese Patent Examined Publication No. 4338/1974, Japanese Patent O.P.I. Publication Nos. 182639/1983 and 19151/1984; $\alpha$-type phthalocyanine compounds described in Japanese Patent O.P.I. Publication No. 239348/1986; $\beta$-type phthalocyanine compounds described in Japanese Patent O.P.I. Publication No. 67094/1987; and m-type phthalocyanine compounds described in the Bulletin of Electrophotographic Society, vol. 27, No. 4, pp. 19-24.

The preceding conventional photoreceptors, however, cannot be applied to a duplicator in which exposure is performed with white light, due to their insufficient sensitivities to the shorter and medium wavelength regions.

As stated above, relatively good results were already obtained as to the performance of photoreceptors for electrophotographic duplicators and those for semiconductor laser printers. However, there have not yet been developed a photoreceptor having a higher sensitivity over a broad wavelength range, from shorter to longer, which is applicable to the semiconductor laser printer provided with a duplicating function.

In response to the demand for a photoreceptor having a higher sensitivity to the shorter to longer wavelength region, a photoreceptor containing both a N-dimethyldiphenylamine-based disazo pigment and an anthraquinone-based disazo pigment (disclosed in Japanese Patent O.P.I. Publication No. 236048/1988) and a photoreceptor containing a N-dimethyldiphenylamine-based disazo pigment and a phenanthraquinone-based disazo pigment (disclosed in Japanese Patent O.P.I. Publication No. 236049/1988) have been proposed as a panchromatic photoreceptor. However, there is yet room for improvement in these photoreceptors.

The spread of high-speed information processing and the development of small-sized duplicators and printers, including small-sized sensitive drums, have led to significantly shortened duplication time. Further, digitalization has advanced and duplication has come to be done more frequently than ever. Under these circumstances, there have been increasing demands for an enhanced sensitivity, stable electrification properties, quick responsiveness to light decay, chemical durability and a longer shelf life.

SUMMARY OF THE INVENTION

The object of the present invention is to provide a photoreceptor having an improved repeatability and a higher sensitivity over a broad wavelength region from the visible to near-infrared range which is applicable to a device capable of printing and duplicating, in which duplication is performed with white light, and can be employed effectively in high-speed duplicating processes.

The photoreceptor for electrophotography of the invention comprises a substrate and provided thereon a light-sensitive layer containing a carrier-generating material and a carrier-transferring material, wherein said light-sensitive layer contains a layer containing, a titanylphthalocyanine and a polycyclic quinone pigment or an azo pigment.

DETAILED DESCRIPTION OF THE INVENTION

The examples of titanylphthalocyanine usable in the invention include (1) α-type titanylphthalocyanines having a strong peak at Bragg angles (2θ) of 7.5°, 12.3°, 16.3°, 25.3° and 28.7° (including errors within the range of plus or minus 0.2 degrees. In an X-ray diffraction spectrum with a Cu-Kα ray (wavelength: 1.54A); (2) β-type titanylphthalocyanines having a strong peak at 9.3°, 10.6°, 13.2°, 15.1°, 15.7°, 16.1°, 20.8°, 23.3°, 26.3° and 27.1°; (3) m-type titanylphthalocyanines having a strong peak at 6.9°, 15.5° and 23.4°; and (4) titanylphthalocyanines having a strong peak at 9.6° and 27.2° (in the present invention, referred to as Y-type titanylphthalocyanines and distinguished from the preceding three types).

The peaks as mentioned above mean acute-angled, drill-like projections which are apparently different from those attributable to noises.

The basic structure of the titanylphthalocyanines usable in the invention can be represented by the following formula [Pc]:

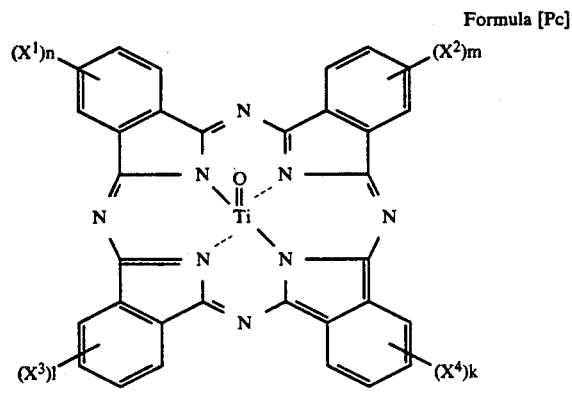

Formula [Pc]

wherein $X^1$, $X^2$, $X^3$ and $X^4$ each represent a hydrogen atom, a halogen atom, an alkyl group of an alkoxy group, and n, m, l and k each represent an integer of 0 to 4.

The preceding X-ray diffraction spectrum was a reflection diffraction spectrum obtained by means of Model 320 automatic recording spectrophotometer (manufactured by Hitachi Ltd.), under the following conditions:

X-ray tube bulb: Cu
Voltage: 40.0 KV
Current: 100 mA
Start angle: 6.00 deg.
Stop angle: 35.00 deg.
Step angle: 0.020 deg.
Measurement time: 0.50 sec.

Titanylphthalocyanines according to the present invention (hereinafter referred to as TiOPc) can be prepared, for example, by the following method:

Titanium tetrapropoxide is added to the mixture of 1,3-diiminoindolyne and sulfolane, allowed to react in a nitrogen atmosphere at 80° to 300° C., preferably 100 to 260° C. After the completion of the reaction, the mixture is allowed to cool. A precipitate is filtered out to obtain a titanylphthalocyanine.

In the above process, besides ordinary stirrers, use can be made of a homomixer, a disperser, an agitator, a ball mill, a sandmill, an attritor, or the like.

Of the preceding titanylphthalocyanines, Y-type titanylphthalocyanines are employed, and preferable are crystalline titanylphthalocyanines of which the peak intensity at a Bragg angle (2θ) of 9.6° is not less than 40% of the peak intensity at 27.2°. In the present invention, for an enhanced sensitivity and improved electrification properties, it is especially preferable to employ a crystalline titanylphthalocyanine of which the peak intensity at 9.6° is not less than 60% of the peak intensity at 27.2° and/or a crystalline titanylphthalocyanine of which the peak intensity at 9.6° is not less than 50% of the peak intensity at 27.2° and the peak intensity at 6.7° is not more than 30% of the peak intensity at 27.2°.

Figure 1A:
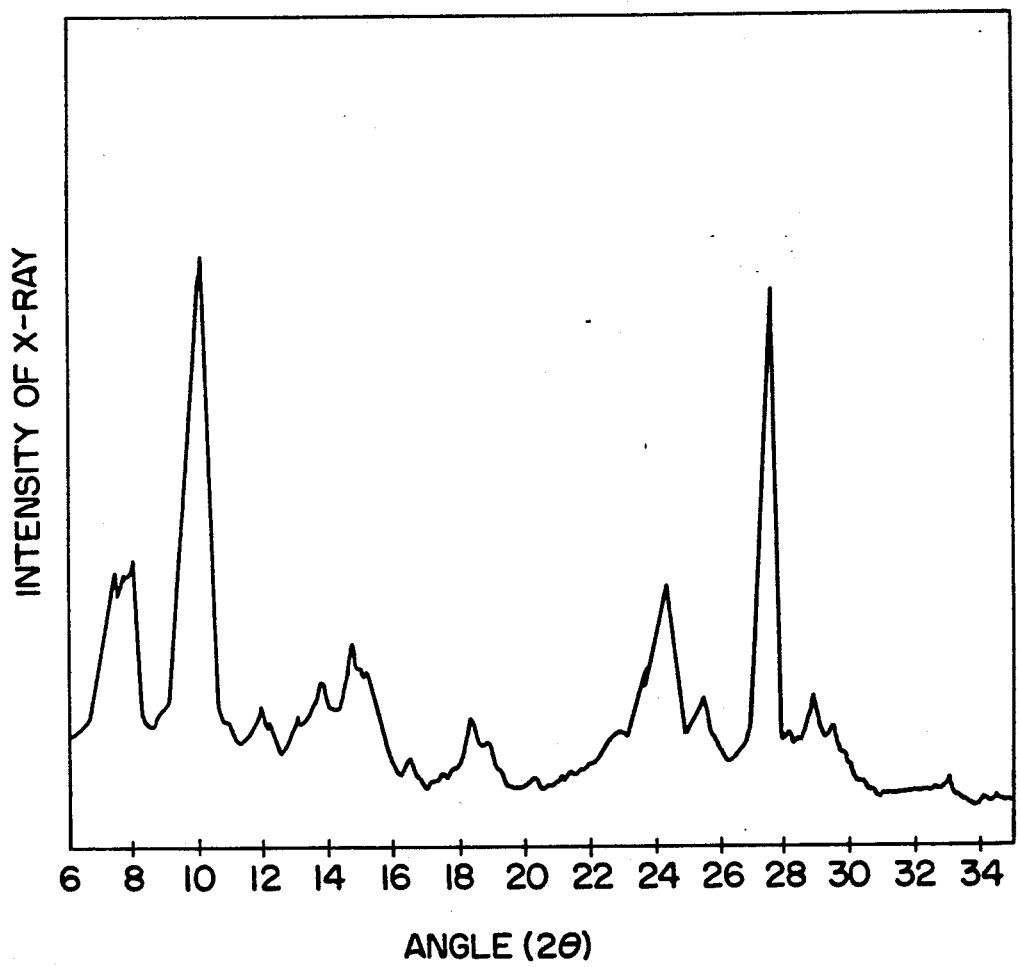
FIG. 1(a) and 1(b) is an X-ray diffraction spectrum of TiOPc used in the photoreceptor of the invention.
Figure 1B:
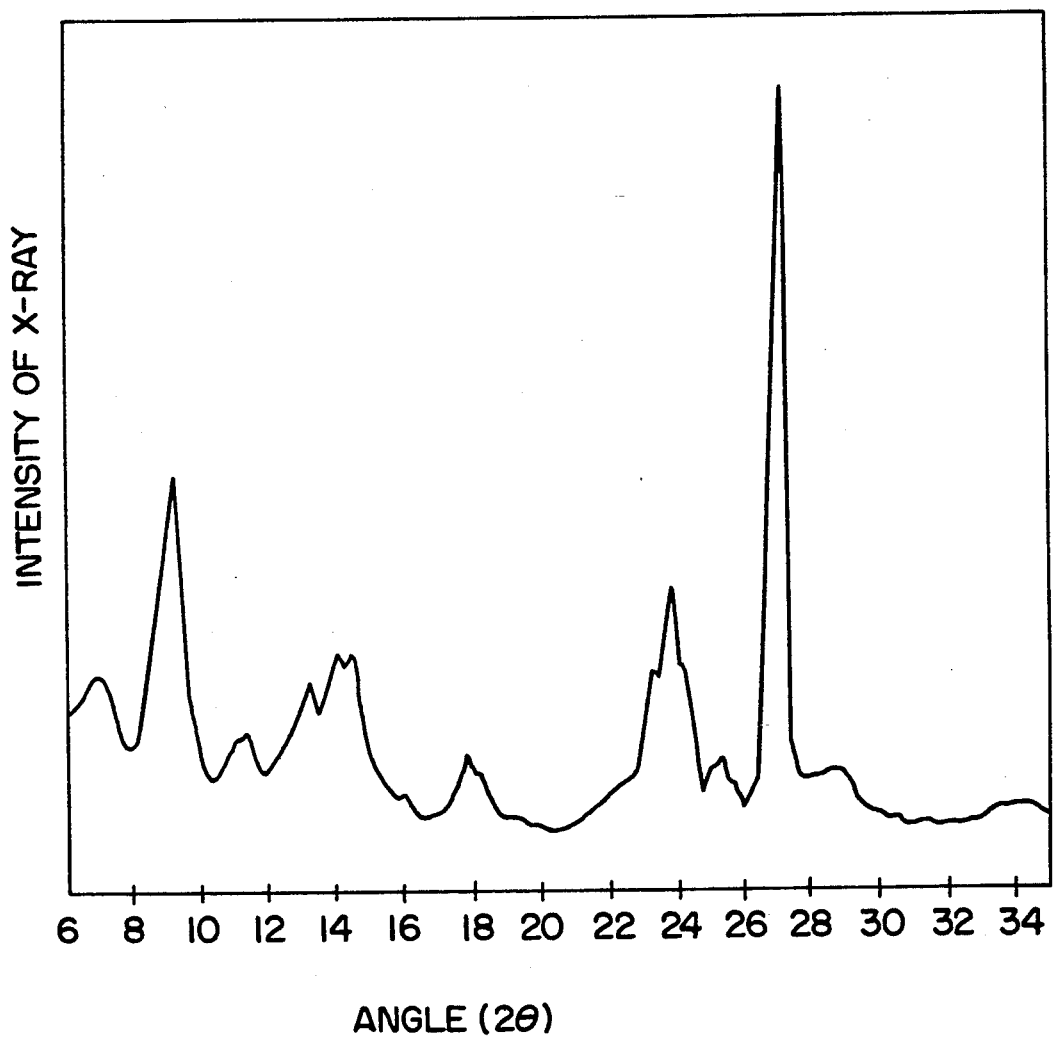
Figure 2:
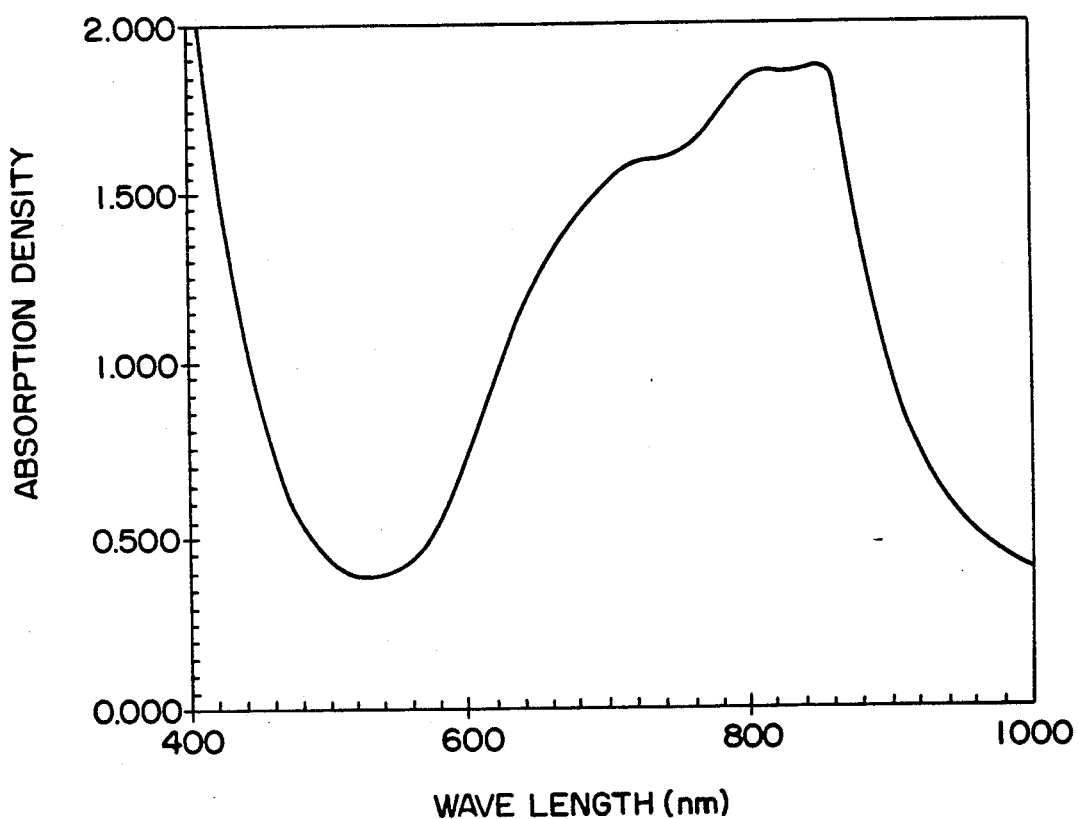
FIG. 2 is an absorption spectrum of TiOPc.

FIG. 1 shows an X-ray diffraction pattern of TiOPc at a Bragg angle of 2 showing the peak intensities. FIG. 1 (a) illustrates the X-ray diffraction pattern of synthesis Example 1, infra and FIG. 1 (b) shows the X-ray diffraction pattern of Example 3 also described infra. FIG. 2 shows an absorption spectrum of TiOPc. As shown in these figures, TiOPc has a major absorption peak in the longer wavelength region and a deep trough in the shorter wavelength region.

As the polycyclic quinone-based compound usable in the invention (hereinafter referred to as Polycyclic [Q]), use can be made of at least one selected from anthroanthrone-based pigments represented by Formula [Q₁], dibenzpyrenequinone-based pigments represented by Formula [Q₂] and pyranthrone-based pigments represented by Formula [Q₃].

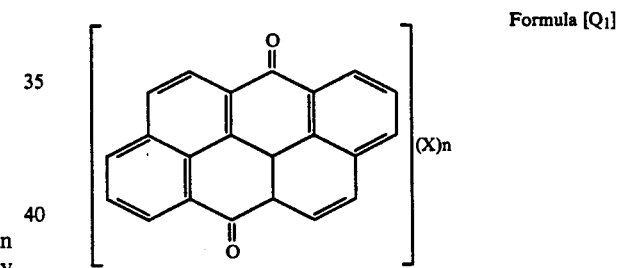

Formula [Q₁]

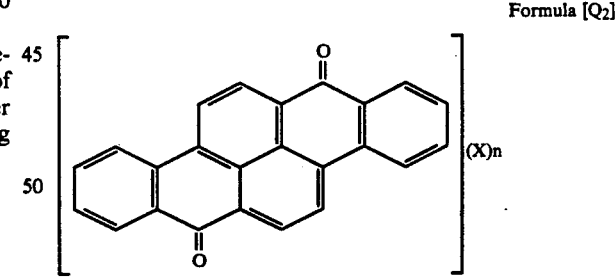

Formula [Q₂]

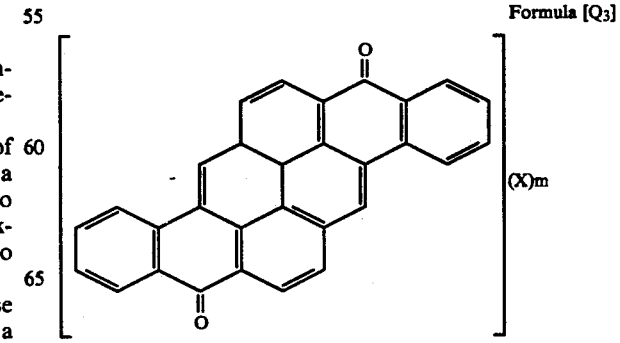

Formula [Q₃]

wherein X represents a halogen atom, a nitro group, a cyano group, an acyl group or a carboxyl group, n represents an integer of 0 to 4 and m represents an integer of 0 to 6.

The specific examples of the anthroanthrone-based pigment represented by Formula [Q₁] are given below:

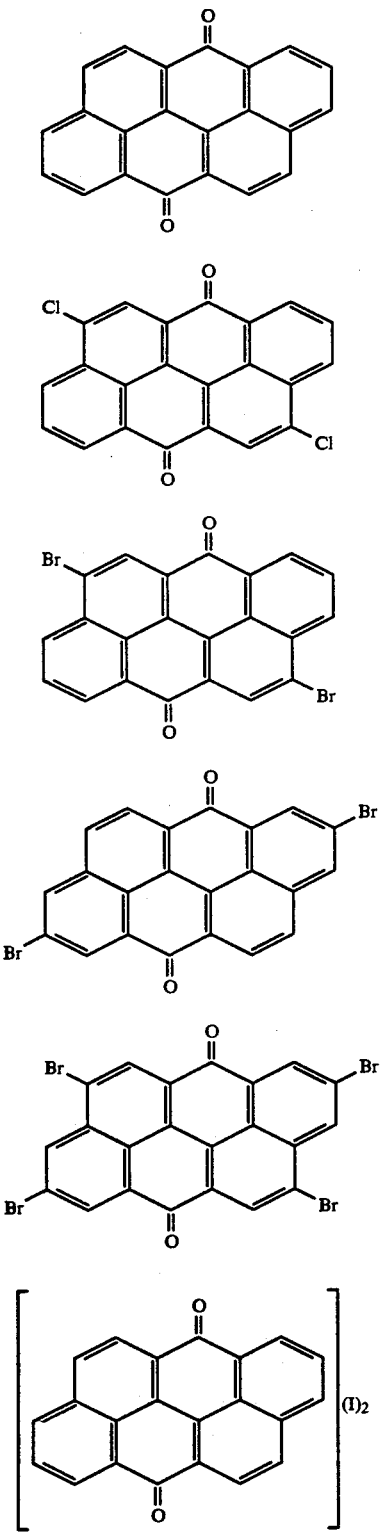

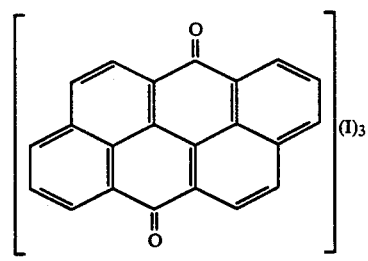

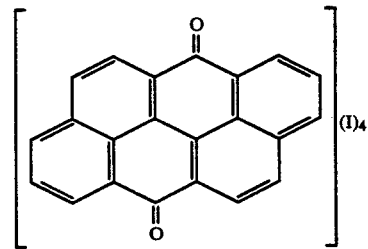

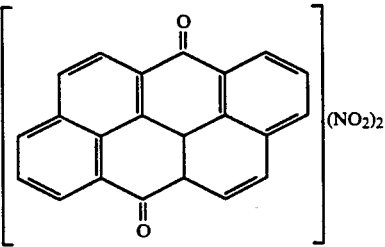

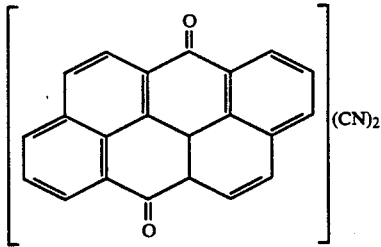

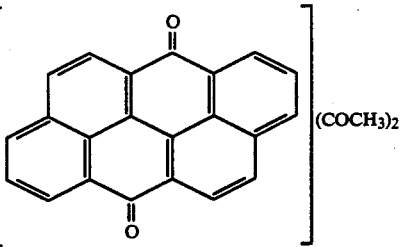

The specific examples of the dibenzpyrenequinone-based pigment represented by Formula [Q₂] are given below:

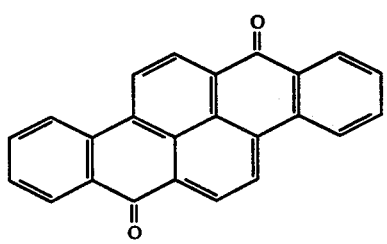

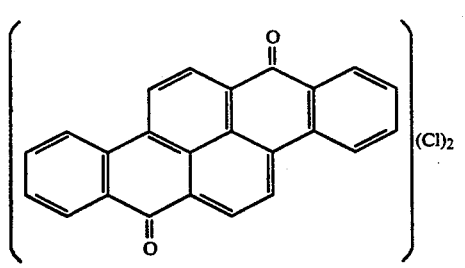 (Q₂-2) (Cl)₂
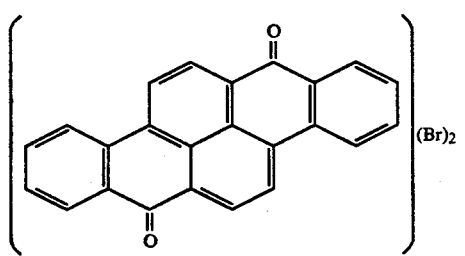 (Q₂-3) (Br)₂
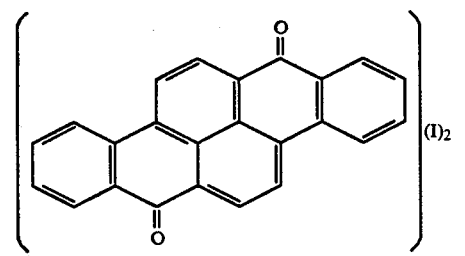 (Q₂-4) (I)₂
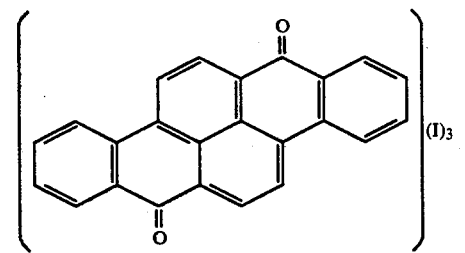 (Q₂-5) (I)₃
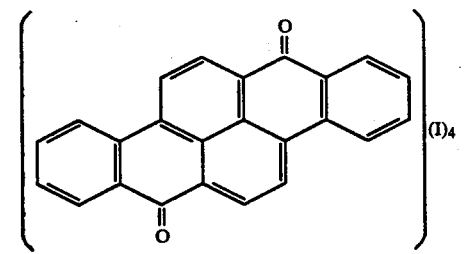 (Q₂-6) (I)₄
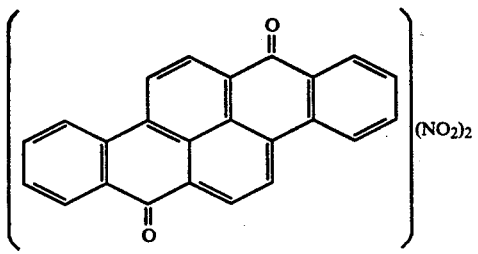 (Q₂-7) (NO₂)₂
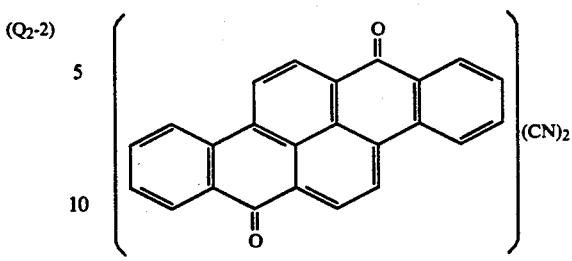 (Q₂-8) (CN)₂
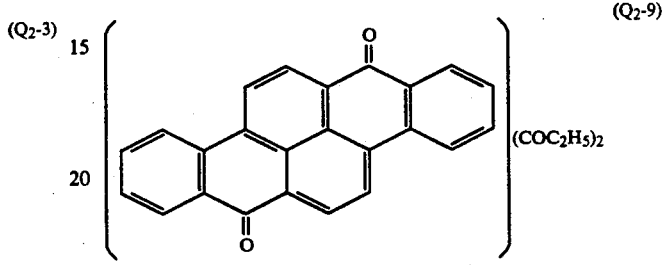 (Q₂-9) (COC₂H₅)₂
The specific examples of pyranthrone-based pigment represented by Formula [Q₃] are given below:
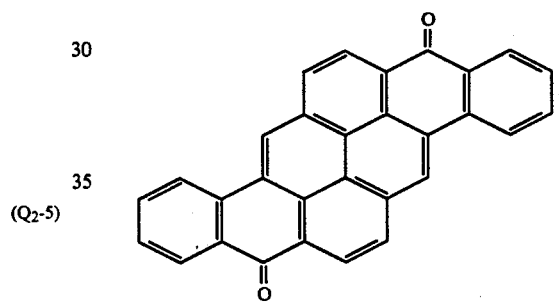 (Q₃-1)
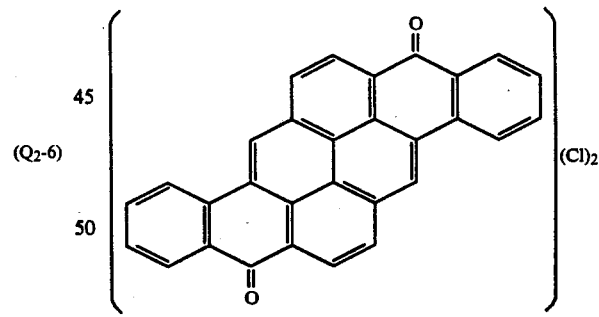 (Q₃-2) (Cl)₂
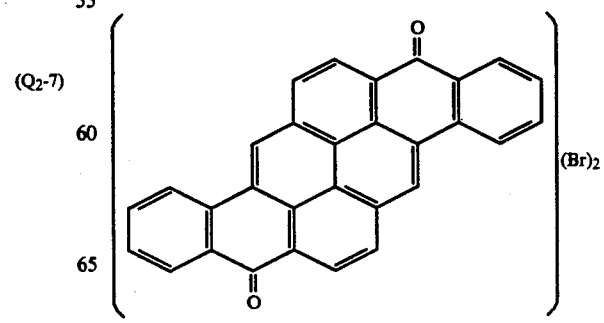 (Q₃-3) (Br)₂

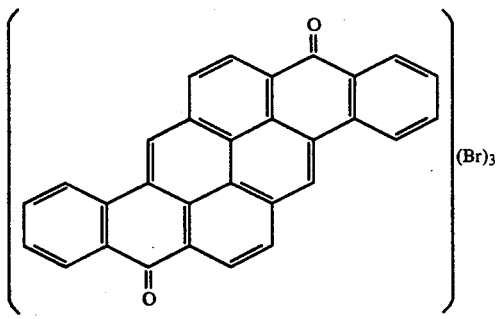
(Q₃-4) (Br)₃

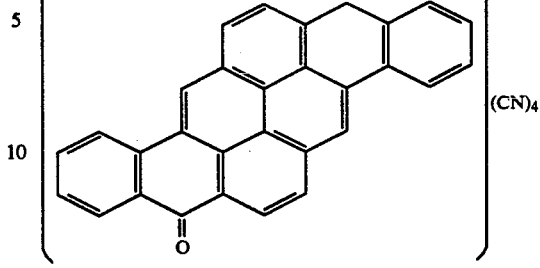
(Q₃-8) (CN)₄

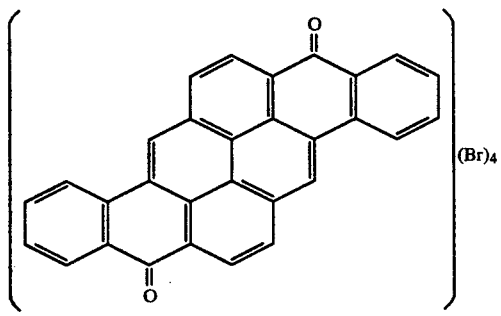
(Q₃-5) (Br)₄

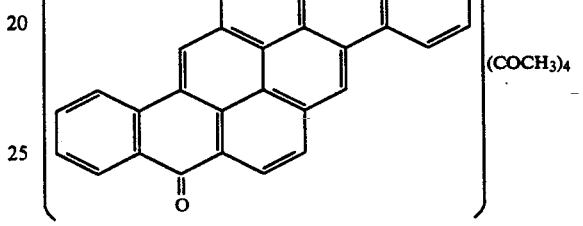
(Q₃-9) (COCH₃)₄

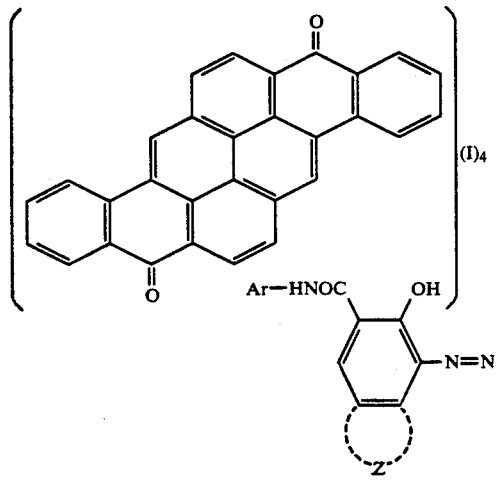
(Q₃-6) (I)₄

Polycyclic [Q] of the invention has a higher sensitivity to wavelengths of 450 to 600 nm, thereby making up for TiOPc's poor sensitivity to shorter wavelengths. Further, the combined use of Polycyclic [Q] and TiOPc leads to a significantly excellent repeatability, which is demonstrated by a minimized variation in charge potential or a smaller residual potential after repeated use.

The bisazo pigment according to the present invention is represented by the following Formula [BA]:

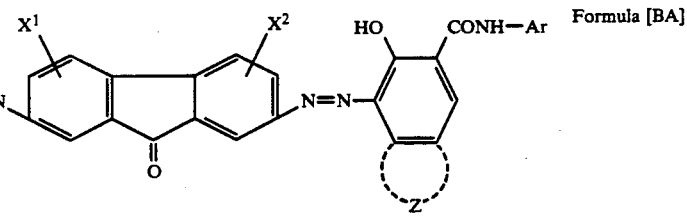
Formula [BA]

In the above formula, $X^1$ and $X^2$ are respectively a hydrogen or halogen atom, for example, chlorine, bromine, fluorine or iodine.

In the present invention, at least one of $X^1$ and $X^2$ is a halogen atom.

Ar represents an aromatic carbocycle or an aromatic heterocycle containing at least one fluorohydrocarbon. The preferred fluorohydrocarbon is one having a carbon number of 1 to 4, the examples of which including trifluoromethyl, pentafluoromethyl, tetrafluoromethyl and heptafluoromethyl. Of them, especially preferable is trifluoromethyl.

The examples of the aromatic carbocycle include phenyl, naphtyl and anthryl. Of them, preferred is phenyl. The examples of the aromatic heterocycle include carbazolyl and dibenzofuryl. In the preceding aromatic carbocycle and aromatic heterocycle, the examples of the substituent other than the fluorohydrocarbon include a substituted or unsubstituted alkyl group having a carbon number of 1 to 4, such as methyl, ethyl,

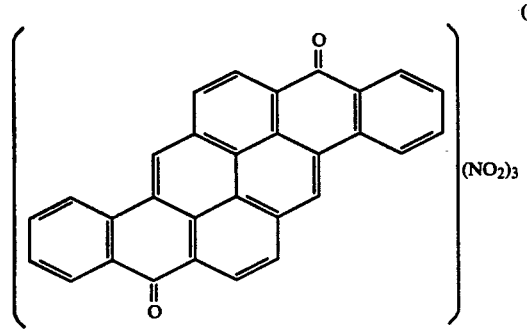
(Q₃-7) (NO₂)₃ isopropyl, t-butyl and trifluoromethyl; a substituted or unsubstituted aralkyl group, such as benzyl and phenethyl; a halogen atom, such as chlorine, bromine, fluorine and iodine; a substituted or unsubstituted alkoxy group having a carbon number of 1 to 4, such as methoxy, ethoxy, isopropoxy, t-butoxy and 2-chloroethoxy; a hydroxy group; a substituted or unsubstituted aryloxy group, such as p-chlorophenoxy and 1-naphthoxy; an acyloxy group, such as acetyloxy and p-cyanobenzoyloxy; a carboxyl group and its ester, such as ethoxycarbonyl and m-bromophenoxycarbonyl; a carbamoyl group, such as aminocarbonyl, t-butylaminocarbonyl and anilinocarbonyl; an acyl group, such as acetyl and o-nitrobenzoyl; a sulfo group and a sulfamoyl group, such as aminosulfonyl, t-butylaminosulfonyl and p-tolylaminosulfonyl; an amino group and an acylamino group, such as acetylamino and benzoylamino; a sulfonamido group, such as methanesulfonamido and p-toluenesulfonamido; a cyano group; and a nitro group.

Of these substituents, preferred are a substituted or unsubstituted alkyl group such as methyl, ethyl, isopropyl, t-butyl and trifluoromethyl; a halogen atom such as chlorine, bromine, fluorine and iodine; a substituted or unsubstituted alkoxy group having a carbon number of 1 to 4, such as methoxy, erhoxy, t-butoxy and 2-chloroethoxy; a nitro group; and a cyano group.

In the above Formula, Z represents a group of atoms necessary for forming a substituted or unsubstituted aromatic carbocycle or a substituted or unsubstituted aromatic heterocycle, the examples of which including a group of atoms necessary for forming a substituted or unsubstituted benzene ring, a substituted or unsubstituted naphthalene ring, a substituted or unsubstituted indole ring or a substituted or unsubstituted carbazole ring.

As the substituents of such group of atoms, use can be made of a series of substituents mentioned above as the substituent of Ar. Of them, preferable are a halogen atom (chlorine, bromine, fluorine and iodine), a sulfo group and a sulfamoyl group (e.g., aminosulfonyl, p-tolylaminosulfonyl).

The preferred examples of the bisazo compound of the present invention which is represented by Formula [BA] (hereinafter referred to as Bisazo [BA]) are those represented by the following Formulae I and II.

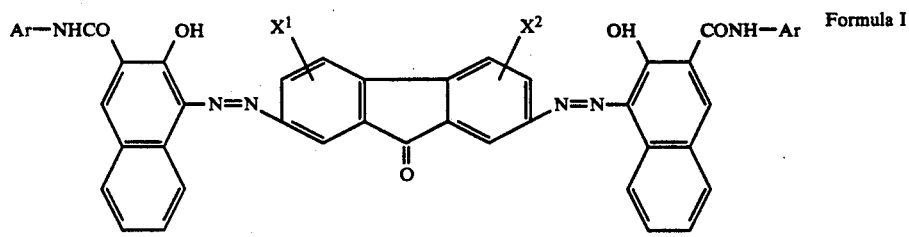

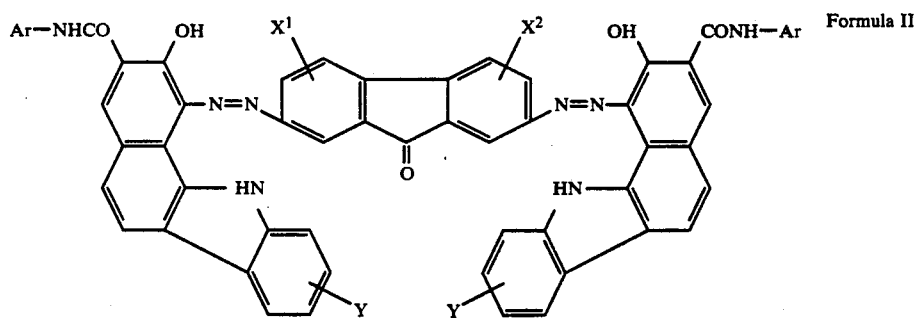

wherein $X^1$ and $X^2$ each represent a hydrogen atom or a halogen atom provided that at least one of $X^1$ and $X^2$ is a halogen atom.

Y has the same meaning as the substituent of Z.

The specific examples of Bisazo [BA] will be given below.

Example Compounds

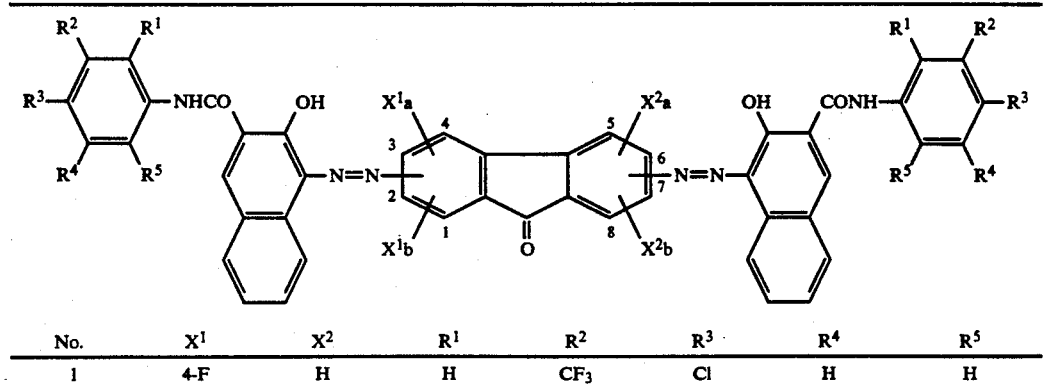

| No. | $X^1$ | $X^2$ | $R^1$ | $R^2$ | $R^3$ | $R^4$ | $R^5$ |
|---|---|---|---|---|---|---|---|
| 1 | 4-F | H | H | $CF_3$ | Cl | H | H |

-continued
Example Compounds
| | | | | | | | |
|---|---|---|---|---|---|---|---|
| 2 | 3-F | 5-F | H | H | $CF_3$ | H | H |
| 3 | 4-Cl | 5-Cl | H | $CF_3$ | H | H | H |
| 4 | 4-Cl | 5-Cl | H | $CF_3$ | H | H | H |
| 5 | 3-F | 5-Cl | H | $CF_3$ | H | H | H |
| 6 | 4-Br | H | H | $CF_3$ | H | H | H |
| 7 | 4-Br | H | $CF_3$ | H | H | H | H |
| 8 | 4-Br | 5-Br | Cl | H | H | $CF_3$ | H |
| 9 | 4-I | H | H | $CF_3$ | H | H | H |
| 10 | 3-I | 5-I | H | $CF_3$ | H | H | H |
| 11 | 3-I | 5-I | Cl | H | H | $CF_3$ | H |
| 12 | 4-Br | H | H | H | $CF_3$ | H | H |
| 13 | 4-F | H | H | $CF_3$ | H | H | H |
| 14 | 4-Cl | H | Cl | H | H | $CF_3$ | H |
| 15 | 3-Br | H | H | $CF_3$ | H | H | H |
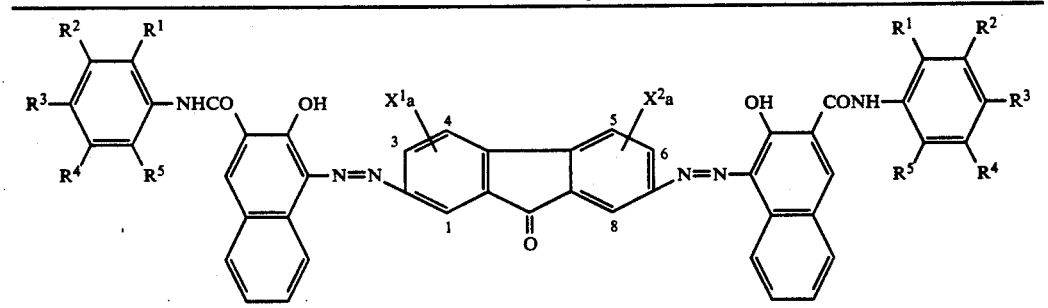
| No. | $X^1$ | $X^2$ | Ar |
|---|---|---|---|
| 16 | 4-F | H | 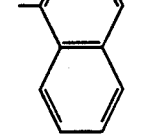 |
| 17 | 4-F | H | 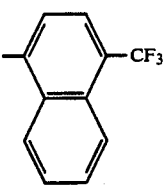 |
| 18 | 4-F | H | 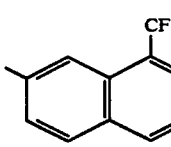 |
| 19 | 3-F | 6-F | 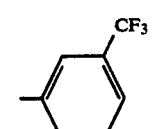 |
| 20 | 3-Cl | 6-Cl | 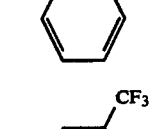 |

-continued
Example Compounds
| No. | X¹ | X² | Ar |
|---|---|---|---|
| 21 | 4-Br | H | 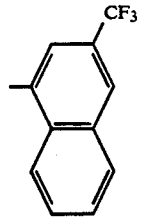 |
| 22 | 3-Br | 6-Br | 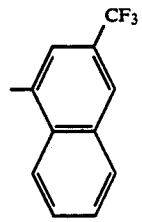 |
| 23 | 4-I | H | 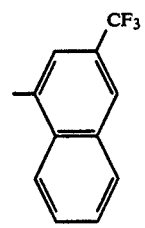 |
| 24 | 3-I | 6-I | 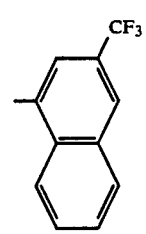 |
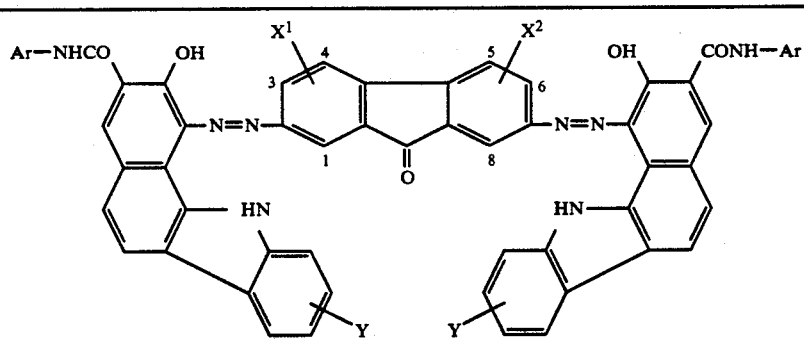
| No. | X¹a | X²a | Y | Ar |
|---|---|---|---|---|
| 25 | 4-F | H | H | 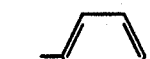 |
| 26 | 4-Cl | H | H |  |

-continued

Example Compounds

| | | | | |
|---|---|---|---|---|
| 27 | 4-Br | H | Cl | 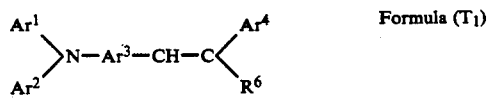 |
| 28 | 4-I | H | H | 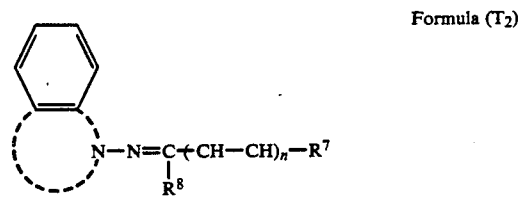 |

These azo compounds can be prepared readily by, for example, the process described in Japanese Patent O.P.I. Publication No. 229564/1984.

Bisazo [BA] of the invention has a higher sensitivity to wavelengths of 450 to 600 nm, thus making up for TiOPc's poor sensitivity in the shorter wavelength region. Further, the combined use of Bisazo [BA] and TiOPc leads to an excellent repeatability, which is demonstrated by a minimized variation in charge potential and a smaller residual potential after repeated use.

There is no definite standard in selecting a combination of different carrier-generating materials. The combination of TiOPc and Polycyclic [Q] or Bisazo [BA] has been found by the inventors as a result of repeated experiments.

Figure 3:
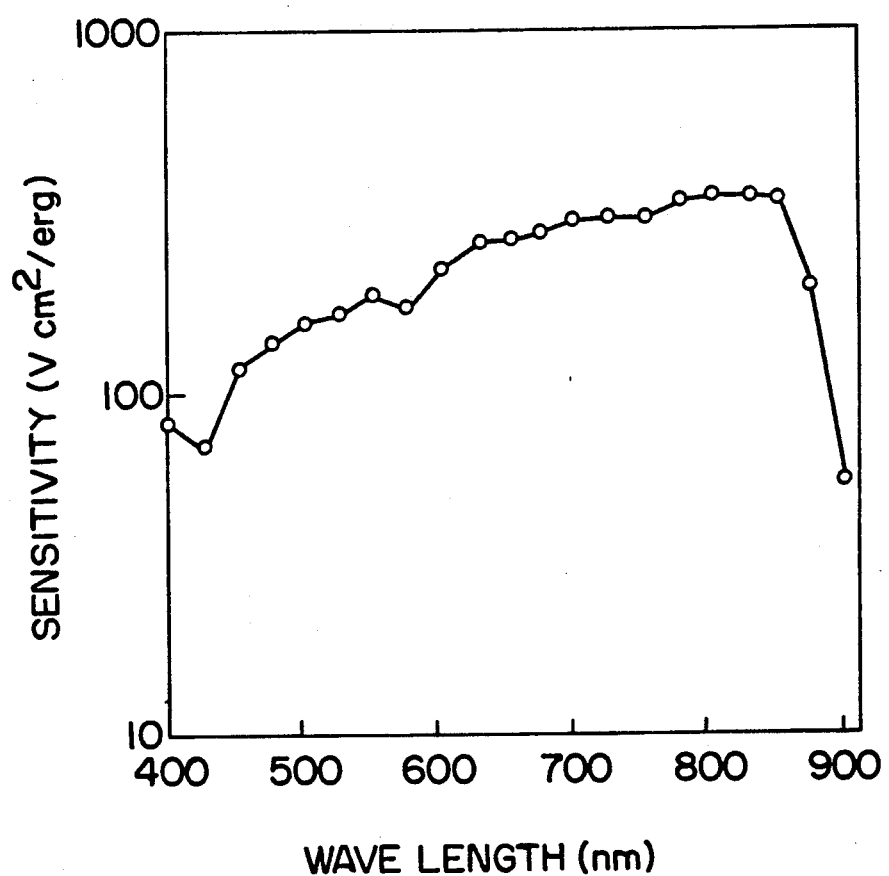
FIG. 3 is a sensitivity spectrum obtained by the combined use of TiOPc and Polycyclic [Q]

FIG. 3 shows a sensitivity spectrum obtained by the combined use of TiOPc and Polycyclic [Q].

The combination of the present invention has enabled a photoreceptor to have a higher sensitivity over a wider portion of the spectrum from longer to shorter wavelengths. Also, this combination has led to the minimized hysterisis of an electric potential when a photoreceptor is repeatedly used.

A photoreceptor of the invention can be applied not only to a copying machine which requires a higher sensitivity to the visible range (light source: a fluorescent lamp, a halogen lamp or a xenon lamp image signals = analog), but also to a printer which requires a higher sensitivity to the longer wavelength region or infrared region (light source: a light-emitting diode, a gas laser such as a He-Ne laser or a semiconductor laser. Image signals = digital). That is, the combination of these carrier-generating materials permits application to both the analog and digital systems.

In the present invention, the kind of carrier-transferring material is not critical. For instance, use can be made of oxazol derivatives, oxadiazol derivative, thiazole derivatives, thiadiazole derivatives, triazole derivatives, imidazole derivatives, imidazolone derivatives, imidazolysine derivatives, styryl compounds, hydrazone compounds, pyrazoline derivatives, amine derivatives, oxazolone derivatives, benzothiazole derivatives, benzimidazole derivatives, quinazoline derivatives, benzofuran derivatives, acridine derivatives, phenazine derivatives, aminostilbene derivatives, poly-N-vinylcarbazole, poly-1-vinylpyrene and poly-9-vinylanthracene. These carrier-transferring materials can be employed either singly or in combination.

The carrier-transferring material is required to be excellent in transferring to the support a carrier generated at the time of irradiation, and also needed to be suitable for use in combination with TiOPc and Polycyclic [Q] or Bisazo [BA]. In this sense, preferred carrier-transferring materials are those represented by the following Formulae (T₁), (T₂) and (T₃)

$$\begin{matrix} Ar^1 \\ \phantom{Ar}\searrow \\ \phantom{Ar}\phantom{\searrow}N-Ar^3-CH-C \\ \phantom{Ar}\nearrow \phantom{xxxxxxxxxx} \searrow \\ Ar^2 \phantom{xxxxxxxxxxxx} R^6 \end{matrix}$$  Formula (T₁)

$$\begin{matrix} \phantom{xxxxx} Ar^4 \\ \phantom{xxxxx} \nearrow \end{matrix}$$

wherein $Ar^1$, $Ar^2$ and $Ar^4$ each represent a substituted or unsubstituted aryl group, $Ar^3$ represents a substituted or unsubstituted allylene group and $R^6$ represents a hydrogen atom, a substituted or unsubstituted alkyl group or a substituted or unsubstituted aryl group.

The examples of such compound are described in Japanese Patent O.P.I. Publication Nos. 65440/1983(pp.3 to 4) and 3/1983 (pp.3 to 6).

Formula (T₂)

(structure with N—N=C(—CH—CH)ₙ—R⁷ with R⁸ substituent)

wherein $R^7$ represents a substituted or unsubstituted aryl group or a substituted or unsubstituted heterocycle and $R^8$ represents a hydrogen atom, a substituted or unsubstituted alkyl group or a substituted or unsubstituted aryl group.

The examples of such compound are described in Japanese Patent O.P.I. Publication Nos. 134642/1983 and 166354/1983.

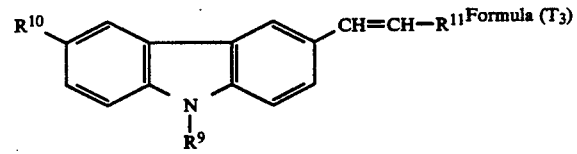 Formula (T₃)

wherein $R^9$ represents a substituted or unsubstituted aryl group, $R^{10}$ represents a hydrogen atom, a halogen atom, a substituted or unsubstituted alkyl group, a substituted or unsubstituted alkoxy group, a substituted or unsubstituted amino group, a hydroxy group, $R^{11}$ represents a substituted or unsubstituted aryl group or a substituted or unsubstituted heterocycle. The synthesis process and examples of such compound are described in Japanese Patent Examined Publication No. 148750/1982.

Other than the above, hydrazone compounds described in Japanese Patent O.P.I. Publication Nos. 67940/1982, 15252/1984 and 101844,/1982 are also preferable as the carrier-transferring material.

The kind of binder resin used in forming a carrier-generating layer or a carrier-transferring layer is not critical, but preferably a hydrophobic, insulating, film-forming and thermosetting polymer or resin with a high dielectric constant.

The thermosetting resin includes those obtained by condensation polymerization and those obtained by addition polymerization.

The former includes phenol resins, urea resins, melamine resins, melamine-phenol resins, guanamine resins and silicone resins. The latter includes unsaturated polyester resins, alkyd resins, diallylphthalate resins, epoxy resins and polybutadiene resins.

Other resins may be used in combination with the above, as long as they will not cause any adverse effects on the performance of a photoreceptor.

The specific examples of usable binder resins are given below:

P-1: polycarbonate
P-2: polyester
P-3: methacrylic acid resin
P-4: acrylic acid resin
P-5: polyvinyl chloride
P-6: polyvinylidene chloride
P-7: polystyrene
P-8: polyvinylacetate
P-9: styrene-butadiene copolymer
P-10: vinylidene chloride-acrylonitrile copolymer
P-11: vinyl chloride-vinyl acetate copolymer
P-12: vinyl chloride-vinyl acetate-maleic anhydride copolymer
P-13: silicone resin
P-14: silicone-alkyd resin
P-15: phenol-formaldehyde resin
P-16: styrene-alkyd resin
P-17: poly-N-vinylcarbazole
P-18: polyvinylbutyral
P-19: polyvinylformal These binder resins are used either singly or in combination.

An antioxidant may be added to the light-sensitive layer of the invention for the prevention of oxidation by ozone generated by corona discharge. The usable antioxidants include hindered phenols, hindered amines, paraphenylenediamines, arylalkanes, hydroquinones, spirochromans, spiroindanones, their derivatives, organic sulfur compounds and organic phosphorus compounds. The specific examples of these compounds are described in Japanese Patent O.P.I. Publication Nos. 14153/1988, 1988, 44662/1988, 50848/1988, 50849/1988, 58455/1988, 1988, 71857/1988 and 146046/1988.

For an enhanced sensitivity, a smaller residual potential and excellent fatigue performance in repeated use, one or a plurality of electron-accepting substance may be contained in the carrier-generating layer. In this case, the weight ratio of the carrier-generating material to the electron-accepting substance is 100 : (0.01-200), preferably 100 : (0.1-100).

Such electron-accepting substance may also be added to the carrier-transferring layer. The weight ratio of the carrier-transferring material to the electron-accepting substance is 100 : (0.01-100), preferably 100 : (0.1-50).

The specific examples of the electron-accepting substance are given, for instance, in Japanese Patent O.P.I. Publication No. 168656/1988.

The photoreceptor of the invention may further contain an ultraviolet ray absorbent for the protection of a light-sensitive layer, a dye for color compensation, and other agents, if need arises.

The photoreceptor of the invention may have a structure in which a carrier-generating layer, a carrier-transferring layer, and if necessary, adjunctive layers such as a protective layer, an intermediate layer, a barrier layer and an adhesion layer are provided in sequence on the support.

The carrier-generating layer may be provided by the following methods:

1) Coating on a support a solution obtained by dissolving a carrier-generating material in a suitable solvent, followed by the addition of a binder resin, if necessary.

2) Coating on a support a dispersion obtained by dividing a carrier-generating material into fine particles (preferably not more than 5 μm, more preferably 1 μm in particle diameter) by means of a ball mill, a homomixer, or the like, in a dispersion medium, followed by the addition of a binder resin, if necessary.

The solvents or dispersion mediums usable in forming a carrier-generating layer are butylamine, diethylamine, ethylenediamine, isopropanolamine, triethanolamine, triethylenediamine, N,N-dimethylformamido, acetone, methylethylketone, cyclohexanone, benzene, toluene, xylene, chloroform, 1,2-dichloroethane, 1,2-dichloropropane, 1,1,2-trichloroethane, 1,1,1-trichloroethane, trichloroethylene, tetrachloroethane, dichloromethane, tetrahydrofurane, dioxane, methanol, ethanol, isopropanol, ethyl acetate, butyl acetate, dimethyl sulfoxide, methyl cellosolve, methyl isobutyl ketone, and the like.

The carrier-transferring layer can be obtained by the same method as that of forming the carrier-generating layer.

The conductive support used in the invention may be a paper or plastic film imparted with conductivity by coating, evaporation-depositing or laminating thereon a plate or drum of a metal including an alloy, a conductive polymer, a conductive compound such as an indium oxide, or a thin film of a metal including an alloy, such as aluminum, palladium and gold.

As the intermediate layers such as the adhesion layer and the barrier layer, use can be made of the preceding polymeric substances usable as the binder resin, an organic polymer such as polyvinyl alcohol, ethyl cellulose and carboxymethyl cellulose or an aluminum oxide.

An explanation will be made on the structure of the photoreceptor of the invention.

FIGS. 4 and 5 each present a cross-sectional view of one form of the photoreceptor of the invention.

FIG. 4 shows a structure in which a carrier-transferring layer (hereinafter abbreviated as CTL) is provided on a carrier-generating layer (hereinafter abbreviated as CGL), which is preferably applied to a photoreceptor for negative electrification. On the other hand, FIG. 5 shows a structure in which CGL is provided on CTL, which is preferable for positive electrification.

In the present invention, the use of two different kinds of carrier-generating material (hereinafter abbreviated as CGM), namely, TiOPc and Polycyclic [Q], permits an embodiment in which two separate CGLs are provided.

Referring to FIG. 4 (a), numeral 1 indicates a support, 2 indicates CGL which consists of upper CGL2A and lower CGL2B, and 3 indicates CTL containing CTM. The photoreceptor shown in FIG. 5 may have the same structure as shown in FIG. 4. In FIGS. 4 to 5, like portions are designated by like numerals.

As to the two-layered CGL, in the case of a photoreceptor for negative electrification as shown in FIG. 4, it is preferred that CGL2A being in contact with CTL and CGL2B being in contact with the support contain TiOPc and Polycyclic [Q]or Bisazo [BA], respectively. In the case of positive electrification as shown in FIG. 5, it is preferred that lower CGL2B being in contact with CTL and upper CGL2A contain TiOPc and Polycyclic [Q]or Bisazo [BA], respectively. This structure leads to improved performance of a photoreceptor. The reason is thought to be associated with an ionization potential or the energy injection barrier of CTL.

Figure 4A:
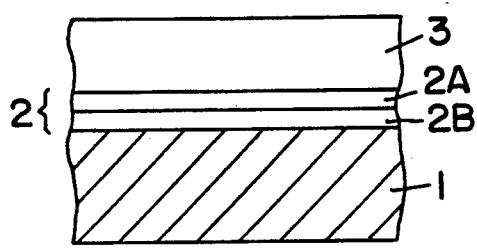
FIGS. 4(a to h) and 5(a to d) are sectional views of one embodiment of the photoreceptor of the invention.
Figure 5A:
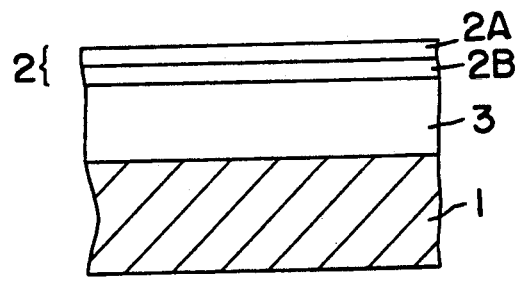

The layer structure of the photoreceptor of the present invention is not limited to those shown in FIGS. 4(a) and 5(a).

Figure 4B:
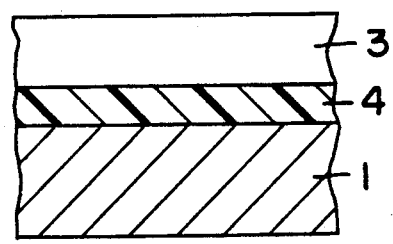
Figure 4C:
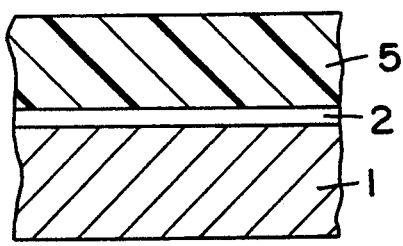
Figure 4D:
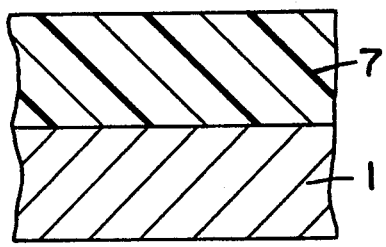
Figure 4E:
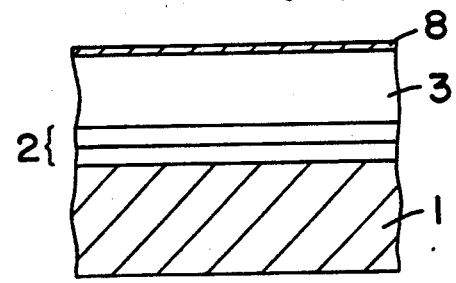
Figure 4F:
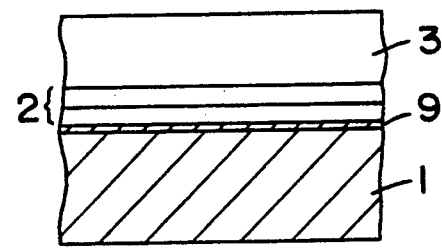
Figure 4G:
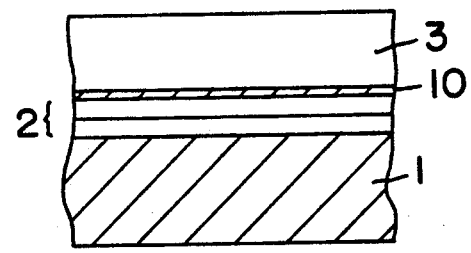
Figure 4H:
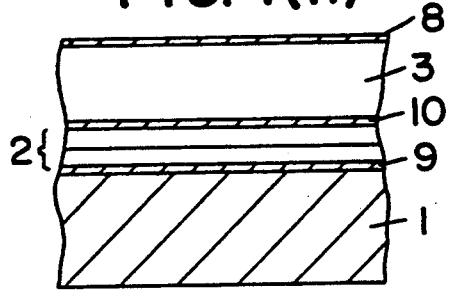
Figure 7:
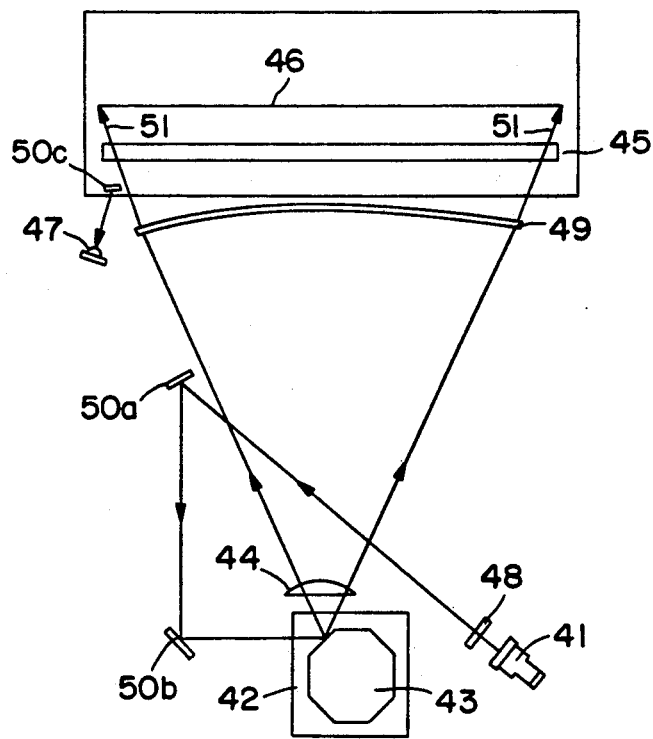
FIG. 7 illustrates the operation of a laser beam scanner.

In FIG. 4(b), numeral 4 indicates CGL composed of both TiOPc and Polycyclic [Q] or Bisazo [BA]. In FIG. 4(c), 5 indicates a carrier-generating/transferring layer (CGTL) in which either one of TiOPc and Polycyclic [Q] or Bisazo [BA] is mixed with CTM. In FIG. 4(d), 7 indicates CGTL in which both TiOPc and Polycyclic [Q] or Bisazo [BA] are mixed with CTM. FIGS. 4(e) to 4(h) correspond to FIGS. 4(a) to 4(d) and show a variation of the negative charging photoreceptor which has a protective layer, a barrier layer, or an interlayer.

The photoreceptor for positive electrification as shown in FIG. 5 may have the same structure as mentioned above.

Figure 5B:
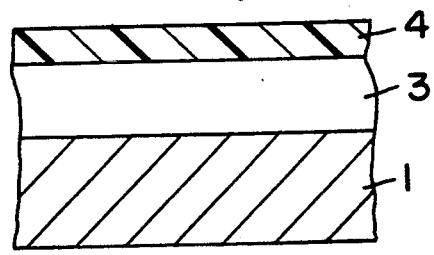
Figure 5C:
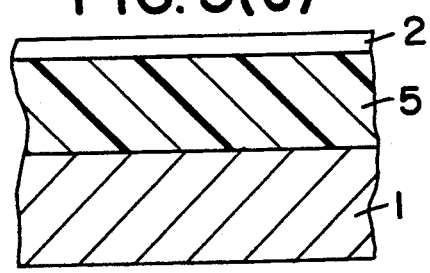
Figure 5D:
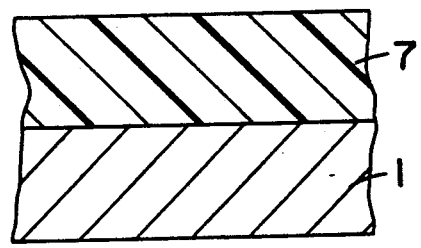

The photoreceptor of the present invention may be provided with adjunctive layers. FIG. 4 shows an embodiment in which a protective layer 8, a barrier layer 9 (or an adhesion layer) and an intermediate layer 10 are provided. The same can be applied to the photoreceptor shown in FIG. 5. FIGS. 5(b) to 5(d) show variations of FIG. 5(b) and include a protective layer, a barrier layer or an interlayer, for a positive charging photoreceptor.

In CGL, the weight ratio of CGM to the binder is preferably 100 : 0 to 1000. The CGM's content smaller than this leads to a poor sensitivity and increased residual potentials. An excessively large CGM content results in lowering in dark decay and accepting potentials.

In FIGS. 4 and 5, the thickness of CGL 2B is preferably 0.01 to 10 µm, more preferably, 0.05 to 1 µm, and that of CGL 2A is preferably 0.01 to 10 µm, more preferably, 0.5 to 5 µm.

It is preferred that CTM be contained in CTL in an amount of 20 to 200 parts by weight, preferably 30 to 150 parts by weight per 100 parts by weight of a binder resin.

The thickness of CTL is preferably 5 to 50 µm, more preferably 5 to 30 µm.

Figure 6:
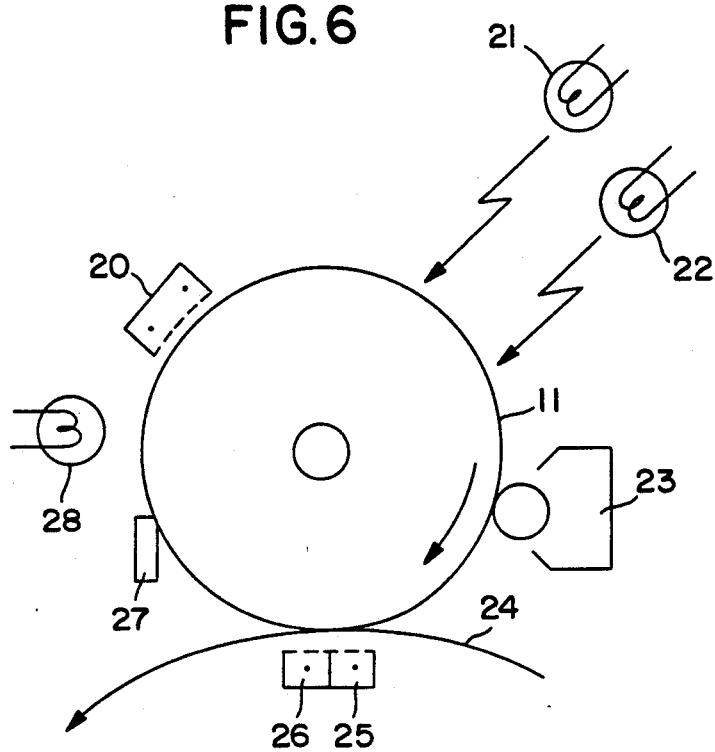
FIG. 6 is a diagrammatical view of one form of an image-forming apparatus in which the photoreceptor of the invention is used.

FIG. 6 shows one form of an image-forming apparatus in which the photoreceptor of the present invention is employed. Numeral 20 indicates electrification electrodes, 21 a light source for longer wavelengths, 22 a light source for shorter wavelengths (visible rays), 23 a developing device, 25 transferring electrodes, 26 separating electrodes, 27 a cleaning blade and 28 a dielectrification lamp.

As to numerals 21 and 22, usable light sources include white light sources, a halogen lamp, a tungsten lamp, a fluorescent lamp, a laser such as a semiconductor laser and a He-Ne laser and LED.

The developing device 23 is either for normal or reversal development. The dielectrification lamp 28 is effective either in normal or reversal development.

When white light is used, an image is formed by subjecting the photoreceptor 11 which has been electrified by the electrodes 20 to imagewise exposure with white light 22, followed by development by the development device 23. The image is then transferred to the transfer paper 24 by the transferring electrodes 25. The transfer paper is separated by the separating electrodes 26, and toner remained in the light sensitive material is scavenged by the cleaning blade 27.

When a laser is used as a light source, an image is formed in the same manner as in the above, except that the photoreceptor is exposed to a laser beam emitted from 21.

In a recording device using a light-sensitive drum, as in the preceding case, it is preferred that imagewise exposure be performed using a laser beam scanner as shown in FIG. 7.

The operation of the laser beam scanner shown in FIG. 7 will be described below:

A laser beam generated by the semiconductor laser 41 is vibrated from side to side within a predetermined scan angle by the polygon mirror 43 rotated by the motor 42. After passing through the f-θ lens, the ray is bent by the reflection mirror 45, and then injected on the surface of the photoreceptor 23 to scan on the line 46.

Numeral 47 indicates an index sensor for detecting the start of scanning. 48 and 49 each indicate a cylindrical lens for the correction of a tilt angle. 50a, 50b and 50c each indicate a reflection mirror for forming a beam scanning path and a beam detecting path.

When the scanning starts, the laser beam is detected by the index sensor 47, and a modulator (not shown) starts modulating the beam by signals. The modulated beam scans on the photoreceptor which has been electrified uniformly in advance by the electrification device 20.

A latent image is formed on the drum surface by the main scanning by the laser beam 51 and the secondary scanning by the rotation of the photoreceptor.

In the case of a belt-like photoreceptor, imagewise exposure may be flash exposure.

EXAMPLES

The following examples will illustrate the present invention.

At first, an explanation will be made on the synthesis of the Y-type titanylphthalocyanine used in the invention:

SYNTHESIS OF TiOPc

Synthesis Example 1

17.0 g of titanium tetraisopropoxide was added to the mixture of 29.2 g of 1,3-diiminoisoindolysine and 200 ml of sulfolane, and allowed to react in a nitrogen atmosphere at 120° C. for 2 hours. After cooling, a precipitate was filtered out, washed with chloroform, a 2% hydrochloric acid, water and methanol in this sequence, and dried to obtain 25.5 g (88.5 %) of titanylphthalocyanine.

The product was dissolved in a 20-fold quantity of concentrated sulfuric acid, an then emptied into a 100- fold quantity of water to precipitate. After filtering out a precipitate, a wet cake was heated at 50° C. for 10 hours by 1,2-dichloroethane, thereby to obtain a Y-type TiOPc having a X-ray diffraction spectrum as shown in FIG. 1(a). The peak intensity of this crystal at a Bragg angle (2θ) of 9.6° was 102% of that at 27.2°. This crystal is designated as TiOPc $Y_1$.

Synthesis Example 2

A wet cake obtained in the same manner as in Synthesis Example 1 was stirred in 1,2-dichloroethane at room temperature for one hour, thereby to obtain a Y-type TiOPc. The peak intensity of this crystal at a Bragg angle (2θ) of 9.6° was 75% of that at 27.2°. This crystal is designated as TiOPc $Y_2$.

Synthesis Example 3

To the mixture of 25.6 g of phthalodinitrile and 150 ml of α-chloronaphthalene, added dropwise 6.5 ml of titanium tetrachloride, and allowed to react at 200° to 220° C. for 5 hours. A precipitate was filtered out, and washed with α-chloronaphthalene, chloroform and methanol in this sequence.

The precipitate was refluxed in aqueous ammonia to complete hydrolysis, washed with water, and then with methanol. After drying, 21.8 g (75.6%) of titanylphthalocyanine was obtained.

The product was dissolved in a 10-fold quantity of concentrated sulfuric acid, and then emptied into a 100-fold quantity of water to precipitate. After filtering out a precipitate, a wet cake was stirred in 1,2-dichloroethane at room temperature for one hour, thereby to obtain a Y-type TiOPc having a X-ray diffraction spectrum as shown in FIG. 1 (b). The peak intensity of this crystal at a Bragg angle (2θ) of 9.6° was 45% of that at 27.2°. This crystal is designated as TiOPc $Y_3$.

Synthesis Example 4

A wet cake obtained in the same manner as in Synthesis Example 3 was stirred in o-dichlorobenzene at room temperature for one hour, thereby to obtain a Y-type TiOPc. The peak intensity of this crystal at a Bragg angle (2θ) of 9.6° was 35% of that at 27.2°. This crystal is designated as TiOPc $Y_4$.

The samples of photoreceptor were prepared as follows:

PREPARATION OF PHOTORECEPTORS

A. Layer structure of photoreceptor

On a support consisting of a polyethylene terephthalate film with aluminum evaporation-deposited thereon, coating materials were applied in sequence to obtain the following layer structures. The values in parentheses indicate layer thicknesses (μm).

Examples 1 to 7

UCL(0.2)-----CGL(0.5)-----CGL(0.3)-----CTL(20)
             Polycyclic [Q]   TiOPc Example 8

UCL(0.2)-----CGL(0.3)-----CGL(0.5)-----CTL(20)
             TiOPc         Polycyclic [Q]

Example 9

UCL(0.2)-----CGL(0.5)-----CTL(20)
             Polycyclic [Q], TiOPc

Example 10

CTL(16)-----CGL(0.3)-----CGTL(20)
            TiOPc        Polycyclic [Q], CTM

Example 11

CTL(16)-----CGL(0.4)-----CGTL(1.0)
            Polycyclic [Q]   TiOPc, CTM

Example 12

CTL(16)-----CGTL(3.0)
            TiOPc, Polycyclic [Q], CTM

Comparative Example 1

UCL(10 g/cm2)---CGL(0.3)---CTL
                CGM(1)     CTM(1)
                CGM(2)

B. CGM and CTM Employed

CGM: TiOPc .... α-, β- and m-type TiOPc, and TiOPc $Y_1$ to $Y_4$

Polycyclic [Q]

CGM-1

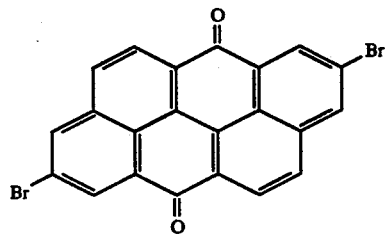

CGM-2

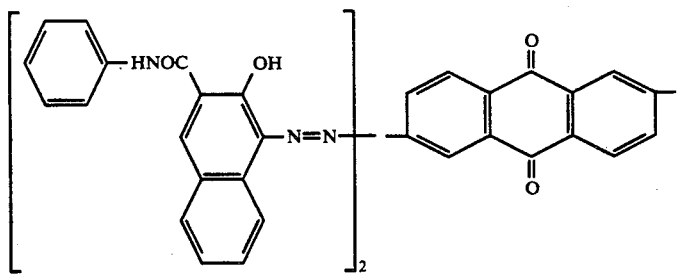

CGM-(1)

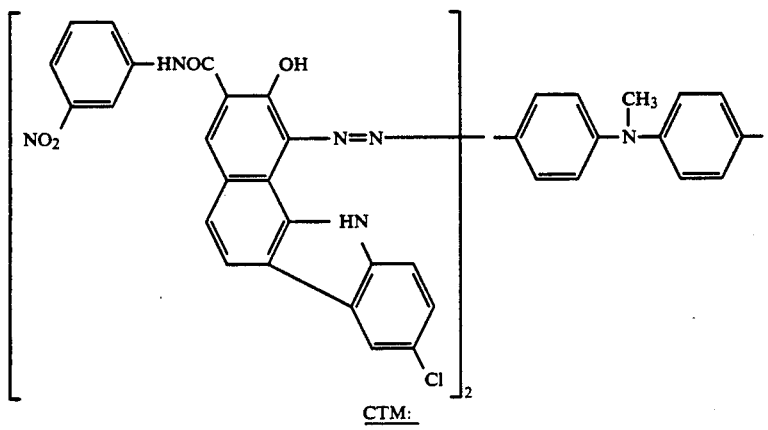

CTM:

CTM-1

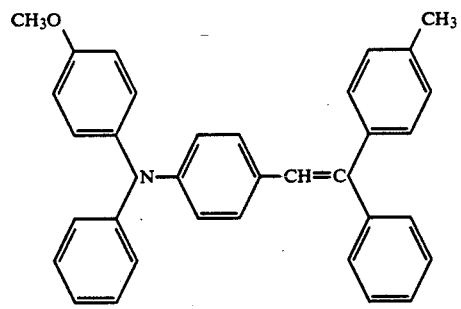

CTM-2

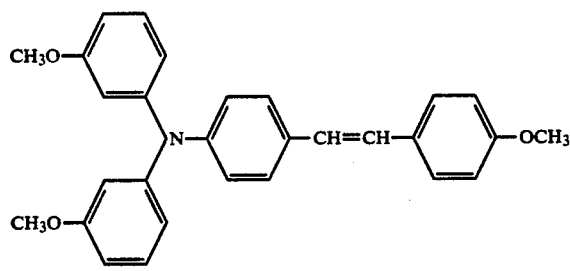

C. Methods for Preparing Coating Materials

The coating material for CTL was prepared by mixing CTM with a binder resin and dissolving with stirring in a solvent.

The coating material for CGL was prepared by mixing CGM with a binder resin and dispersing with stirring uniformly by means of a sand grinder or a ball mill.

The coating material for CGTL was prepared by dispersing CGM in a dispersion medium solution of a binder resin by means of a grinder or a ball mill, followed by the addition of CTM and, if necessary, an antioxidant.

These coating materials are dip-coated on the support in sequence.

Example 1

| | (parts by weight) |
|---|---|
| UCL coating material | |
| Methanol | 90 |
| Polyamide resin | 2 |
| CM-8000; manufactured by Toray Industries Co.) | |
| CGL (lower layer) coating material | |
| 1,2-Dichloroethane (abbreviated as EDC) | 100 |
| Polycarbonate | 1 |
| (Panlite L-1250; manufactured by Teijin Chemical Ltd.) | |
| Vinyl chloride/vinyl acetate/maleic anhydride copolymer (S-LEC MF-10; manufactured by Sekisui Chemical Co., Ltd.) | 0.015 |
| CGM-1 | 2 |
| CGL (upper layer) coating material | |
| Isopropyl alcohol | 100 |
| TiOPc $Y_1$ | 2 |
| Polyvinyl butyral | 2 |
| (S-LEC BMS; manufactured by Sekisui Chemical Co., Ltd) | |
| CTL coating material | |
| EDC | 100 |
| Polycarbonate | 22 |
| (EUPILON Z-200; manufactured by Mitsubishi Gas Chemical Co., Inc.) | |
| CTM-1 | 17 |

Examples 2 to 4

Photoreceptors were prepared in substantially the same manner as in Example 1, except that TiOPc $Y_1$ in upper CGL was varied to α- (Example 2), β-(Example 3) and m-type (Example 4) TiOPc.

Examples 5 to 7

Photoreceptors were prepared in substantially the same manner as in Example 1, except that TiOPc $Y_1$ in the upper CGL was varied to $Y_2$ (Example 5) and $Y_3$ (Example 6) and $Y_4$ (Example 7).

Example 8

| UCL coating material (same as in Example 1) | |
|---|---|
| | (parts by weight) |
| CGL (lower layer) coating material | |
| Methylethylketone (abbreviated as MEK) | 100 |
| Polyvinyl butyral | 2 |
| (S-LEC BH-3) | |
| TiOPc $Y_1$ | 2 |
| CGL (upper layer) coating material | |
| EDC | 100 |
| Polycarbonate | 1 |
| (Panlite L-1250) | |
| CGM-1 | 2 |
| CTL coating material | |
| EDC | 100 |
| Polycarbonate | 20 |
| (EUPILON Z-200) | |
| CGM-2 | 15 |

Example 9

| UCL coating material (same as in Example 1) | |
|---|---|
| | (parts by weight) |
| CGL coating material | |
| MEK | 100 |
| Silicone resin | 1 |
| (KR-5240; manufactured by The Shin-Etsu Chemical Co., Ltd.) | |
| CGM-1 | 2 |
| TiOPc $Y_1$ | 0.2 |

Example 10

| | (parts by weight) |
|---|---|
| Coating material for CTL | |
| EDC | 100 |
| Polycarbonate | 18 |
| (Panlite L-1250) | |
| CTM-2 | 12 |
| Coating material for CGL | |
| Isopropyl alcohol | 100 |
| Polyvinyl butyral | 2 |
| (S-LEC B-3) | |
| TiOPc $Y_1$ | 2 |
| Coating material for CGTL | |
| EDC | 100 |
| Polycarbonate | 8 |
| (EUPILON Z-200) | |
| CTM-1 | 4 |
| CTM-2 | 6 |
| Antioxidant | 0.4 |
| (IRGANOX 1010; manufactured by Ciba-Geigy) | |

Example 11

| CTL coating material (same as in Example 10) | |
|---|---|
| | (parts by weight) |
| CGL coating material | |
| MEK | 100 |
| Butyral resin | 1 |
| (S-LEC BMS; manufactured by Sekisui Chemical Co., Ltd.) | |
| CGM-2 | 2 |
| CGTL coating material | |
| Isopropyl acetate | 100 |
| Silicone resin (KR-5240) | 6 |
| TiOPc $Y_1$ | 2 |
| CTM-1 | 2 |
| Antioxidant | 0.3 |
| (IRGANOX 1010; manufactured by Ciba-Geigy) | |

Example 12

| CTL coating material (same as in Example 4) | |
|---|---|
| | (parts by weight) |
| CGTL coating material | |
| MEK | 100 |
| Silicone resin (KR-5240) | 6 |
| TiOPc $Y_1$ | 2 |
| CGM-1 | 3 |
| CTM-2 | 3 |
| Antioxidant | 0.5 |
| (IRGANOX 1010; manufactured by Ciba-Geigy) | |

Example 13

UCL coating material

-continued

| | |
|---|---|
| Casein | 11.2 g |
| Aqueous ammonia (28%) | 1 g |
| Water | 222 ml |
| CGL coating material | (parts by weight) |
| CGM-(1) | 0.3 |
| CGM-(2) | 0.7 |
| Polyvinyl butyral | 1 |
| (S-LEC BM-2; manufactured by Sekisui Chemical Co., Ltd.) | |
| Isopropyl alcohol | 30 |
| CTL coating material | |
| CTM-(1) | 1 |
| Polysulfone | 1 |
| (P-1700, manufactured by UCC) | |
| Monochlorobenzene | 6 |

TABLE 1

| | Sensitivity to white light (Lux · sec) | Sensitivity to semiconductor laser beam (V · cm$^2$/erg) $\lambda$ = 780 | $|\Delta V_H|0 \rightarrow 100$ [V] |
|---|---|---|---|
| Example 1 | 0.22 | 350 | 10 |
| Example 2 | 1.0 | 85 | 20 |
| Example 3 | 0.91 | 105 | 15 |
| Example 4 | 0.52 | 155 | 25 |
| Example 5 | 0.27 | 280 | 15 |
| Example 6 | 0.33 | 200 | 15 |
| Example 7 | 0.45 | 185 | 20 |
| Example 8 | 0.42 | 200 | 20 |
| Example 9 | 0.25 | 310 | 15 |
| Example 10 | 0.26 | 300 | 15 |
| Example 11 | 0.30 | 255 | 20 |
| Example 12 | 0.31 | 250 | 25 |
| Example 13 | 1.8 | 40 | 50 |

Evaluation of properties

The properties of the above samples were evaluated in the following manner:
The results are shown in Table 1.

SENSITIVITY

Using an electrostatic electrification testing machine (EPA-8100, manufactured by Kawaguchi Electric Co., Ltd.), an amount of exposure (lux sec) needed for the surface potential of a photoreceptor to be reduced one-half its initial value (E1/2) was measured.

REPEATABILITY

Using the preceding EPA-8100, the cycle of electrification, exposure and dielectrification was repeated 100 times, and the difference in charge potential between the first attempt and the last attempt ($\Delta^{0\rightarrow100}$ (V)) was obtained and expressed in terms of $|\Delta V_H|$.

SENSITIVITY TO LONGER WAVELENGTHS

Using the preceding EPA-8100, E1/2 (Vcm/erg) was measured with respect to a monochromatic light of 780±1 nm (this wavelength is important in the present invention) which was obtained by separating a light emitted from a tungsten lamp through a monochrometer. A larger E1/2 value is preferable.

As is evident from the results shown in Table 1, the samples of the present invention (Examples 1, 5, 6 and 8–12) were superior to comparative samples (Examples 2–4, 7, and 13) in sensitivity to white light and a laser beam, as well as in repeatability.

Examples 17 to 39

The conditions for preparing photoreceptors were given below, and summarized in Table 2.

[A] Preparation of coating materials for component layers
(1) Examples 17 to 39.

a. Undercoating layer (UCL)

| | |
|---|---|
| Polyamide resin | 25 gr |
| (CM-8000, manufactured by Toray Industries, Inc.) | |
| Methanol | 1000 ml |

CM-8000 was dissolved in methanol, and applied on an aluminum support to have a thickness of 0.5 μm.

b. CGL

| | |
|---|---|
| CGM (a compound shown in Table 1) | 20 gr |
| Silicone resin | |
| (KR-5240; manufactured by Shinetsu-Silicon Co., Ltd.) | |
| Isopropyl acetate | 1000 ml |

Ingredients were mixed with stirring at 1000 rpm for 2 hours, and coated to have a thickness of 0.5 μm (in the case of a two-layered CGL, upper and lower CGLs each have a thickness of 0.25 μm)

c. CTL

| | |
|---|---|
| CTM (a compound shown in Table 1) | 13 gr |
| Polycarbonate | 22 gr |
| (EUPILON Z-200, manufactured by Mitsubishi Gas Chemical Co., Inc.) | |
| 1,2-dichloroethane | 1000 ml |

CTM and EUPILON Z-200 were mixed and dissolved in 1,2-dichloroethane, and coated to have a thickness of 20 μm.

Meanwhile, the following substances were employed as CGM and CTM:

CGM 1 A ... Y-type TiOPc (Y$_1$, Y$_2$, Y$_3$ and Y$_4$)
B ...

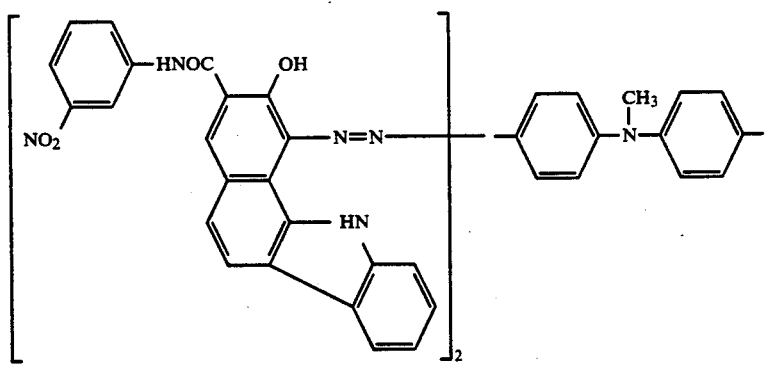
C ... m-type TiOPc
D ... α-type TiOPc
E ... β-type TiOPc
CGM 2 a ... Example Compound No. 21
      a' ... Example Compound No. 22
      a" ... Example Compound No. 23
      a'" ... Example Compound No. 24
      b ...
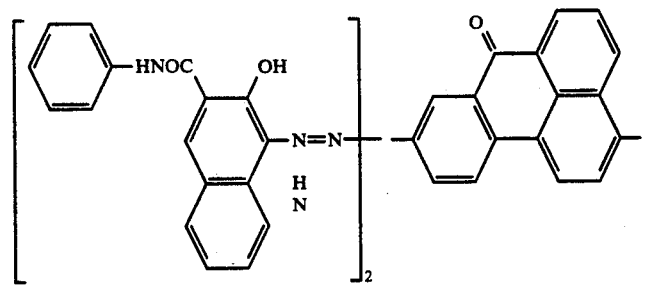
CTM [X] ...
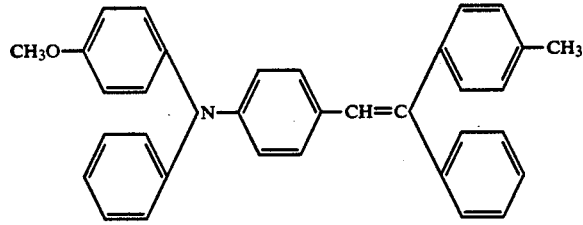
[Y] ...
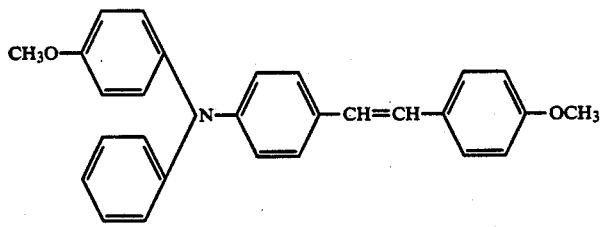
[Z] ...
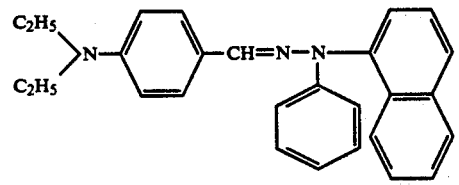

Examples 39

On an aluminum cylinder, an aqueous ammonia solution of casein was coated, dried to form UCL with a thickness of 0.5 μm.

Then, 1 part by weight of the preceding carrier-generating material b, 1 part by weight of polyvinyl butyral and 30 parts by weight of isopropyl alcohol were dispersed by means of a ball mill for 4 hours. This dispersion was applied on the above-obtained UCL by the dip-coating method, followed by drying to have a thickness of 0.25 μm.

Then, 1 part by weight of the preceding carrier-generating material B, 1 part by weight of polyvinyl butyral and 30 parts by weight of isopropyl alcohol were dispersed by means of a ball mill for 4 hours. This dispersion was applied on the above-obtained CGL by the dip-coating method, followed by drying to have a thickness of 0.25 μm.

Meanwhile, in the case of CGL comprising two kinds of CGM Example 39, equal amounts of the preceding two coating materials were mixed and coated to form CGL of 0.5 μm in thickness.

weight of a polycarbonate resin were mixed and dissolved with stirring in 6 parts by weight of dichloromethane by means of a stirrer. This solution was applied on CGL by the dip-coating method, followed by drying to form CGL of 20 μm in thickness.

| [B] Order of providing component layers | |
|---|---|
| Structure I | CGL comprising two different CGM (as shown in FIG. 4 (b)) |
| Structure II | CGL consisting of two layers differing in the kind of CGM (as shown in FIG. 4 (a)) |
| II-1; | TiOPc layer being adjacent to CTL |
| II-2; | BA layer being adjacent to CTL |
| Structure III | CGL consisting of two layers differing in the kind of CGM (as shown in FIG. 5 (a)) |
| III-1; | TiOPc layer being adjacent to CTL |
| III-2; | BA layer being adjacent to CTL |
| [C] Coating method | |
| UCL | the dip-coating method |
| CGL | comprising two different CGM; the dip-coating method consisting of two layers; the ring-coating method |
| CTL | the dip-coating method | in the Table 2, Examples 17–19, 24, 25, 28–30, and 35–38 are samples of the invention and the others are comparative samples.

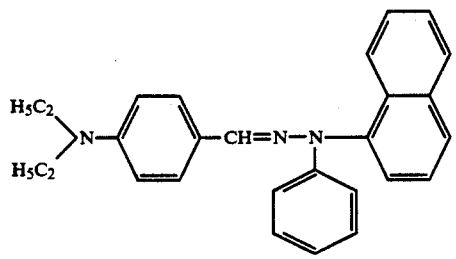

1 part by weight of CTM (a hydrazone compound represented by the following formula) and 1 part by

TABLE 2

Single-layered CGL comprising two different CGM

| | CGL Structure | CGM1 Compound | CGM1 Peak Intensity (%) 9.5/27.2 | CGM2 Compound | CGM1/CGM2 Weight Ratio | CTM Compound | Sensitivity to White Light (Lux · Sec) | Sensitivity to Semiconductor Beam (V · cm²/erg) λ = 780 | $\|\Delta V_H\|0\rightarrow100$ [V] |
|---|---|---|---|---|---|---|---|---|---|
| Example 17 | I | A(Y$_1$) | 102 | a | 100/100 | [X] | 0.53 | 200 | 5(700 → 695) |
| Example 18 | I | A(Y$_2$) | 75 | a | 100/100 | [X] | 0.56 | 190 | 5(695 → 690) |
| Example 19 | I | A(Y$_3$) | 45 | a | 100/100 | [X] | 0.60 | 185 | 5(695 → 690) |
| Example 20 | I | A(Y$_4$) | 35 | a | 100/100 | [X] | 0.68 | 150 | 10(690 → 680) |
| Example 21 | I | C | — | a | 100/100 | [X] | 0.71 | 130 | 20(685 → 675) |
| Example 22 | I | D | — | a | 100/100 | [X] | 0.75 | 85 | 20(680 → 660) |
| Example 23 | I | E | — | a | 100/100 | [X] | 0.82 | 75 | 20(680 → 660) |
| Example 24 | I | A(Y$_2$) | 75 | a' | 100/50 | [X] | 0.61 | 180 | 5(695 → 690) |
| Example 25 | I | A(Y$_2$) | 75 | a" | 50/100 | [X] | 0.72 | 150 | 15(685 → 670) |
| Example 26 | I | — | — | a | 0/100 | [X] | 1.35 | 65 | 35(670 → 635) |
| Example 27 | I | B | — | b | 100/100 | [Z] | 1.65 | 40 | 40(670 → 630) |

TABLE 3

Two-layered CGL

| | CGL Structure | CGM1 Compound | CGM1 Peak Intensity (%) 9.5/27.2 | CGM2 Compound | CTM Compound | Sensitivity to White Light (lux · sec) | Sensitivity to Semiconductor Beam (V · cm²/erg) λ = 780 | $\|\Delta V_H\|0\rightarrow100$ [V] |
|---|---|---|---|---|---|---|---|---|
| Example 28 | II-1 | A(Y$_1$) | 102 | a | [Y] | 0.52 | 205 | 5(700 → 695) |
| Example 29 | II-1 | A(Y$_2$) | 75 | a | [Y] | 0.54 | 200 | 5(695 → 690) |
| Example 30 | II-1 | A(Y$_3$) | 45 | a | [Y] | 0.57 | 190 | 5(695 → 690) |
| Example 31 | II-1 | A(Y$_4$) | 35 | a | [Y] | 0.68 | 150 | 10(690 → 680) |
| Example 32 | II-1 | C | — | a | [Y] | 0.72 | 135 | 15(680 → 665) |

TABLE 3-continued

| | CGL Structure | CGM1 Compound | CGM1 Peak Intensity (%) 9.5/27.2 | Two-layered CGL CGM2 Compound | CTM Compound | Sensitivity to White Light (lux · sec) | Sensitivity to Semiconductor Beam (V · cm²/erg) λ = 780 | \|ΔV$_H$\|0→100 [V] |
|---|---|---|---|---|---|---|---|---|
| Example 33 | II-1 | D | — | a | [Y] | 0.74 | 85 | 15(680 → 665) |
| Example 34 | II-1 | E | — | a | [Y] | 0.80 | 70 | 20(675 → 655) |
| Example 35 | II-2 | A(Y$_2$) | 75 | a | [Y] | 0.69 | 155 | 15(690 → 675) |
| Example 36 | III-1 | A(Y$_2$) | 75 | a | [Y] | 0.58 | 185 | 10(695 → 685) |
| Example 37 | III-2 | A(Y$_2$) | 75 | a | [Y] | 0.63 | 170 | 10(695 → 685) |
| Example 38 | II-1 | A(Y$_2$) | 75 | a''' | [Y] | 0.56 | 195 | 5(705 → 700) |
| Example 39 | II-1 | B | — | a | [Z] | 1.7 | 50 | 40(670 → 630) |

EVALUATION OF PROPERTIES

The properties of Sample No. 17 were evaluated in the following manner:
The results are shown in Table 2.

SENSITIVITY

Using an electrostatic electrification testing machine (EPA-8100, manufactured by Kawaguchi Electric Co., Ltd.), an amount of exposure (lux sec) needed for the surface potential of a photoreceptor to be reduced one-half its initial value (E1/2) was obtained.

REPEATABILITY

Using the preceding EPA-8100, the cycle of electrification, exposure and dielectrification was repeated 100 times, and the difference in charge potential between the first attempt and the last attempt ($\Delta^{0 \rightarrow 100}$ (V)) was obtained and expressed in terms of $|\Delta V_H|$.

SENSITIVITY TO LONGER WAVELENGTHS

E1/2 erg) was measured with respect to a monochromatic light of 780±1 nm (this wavelength is important in the invention) which was obtained by separating a light emitted from a tungsten lamp through a monochrometer. A larger E1/2 is preferable.

As is evident from the results shown in Table 1, the samples of the present invention were superior to comparative samples in sensitivity to white light and a laser beam, as well as in repeatability. Among the samples of the present invention, especially preferred are those having a two-layered CGL in which the TiOPc-containing layer is adjacent to the CTL.

What is claimed is:

1. An electrophotographic photoreceptor comprises a light-sensitive layer provided on a substrate, wherein the light-sensitive layer contains;
   a crystalline titanylphthalocyanine providing, in an X-ray diffraction spectrum with a CuK α ray (1.541Å), characteristic peaks of Bragg angles (2θ) of 9.6°±0.2°) and 27.2°±0.2°, and a peak intensity at 9.6°±0.2° is not less than 40% of that at 27.2°±0.2°, and
   a polycyclic quinone pigment represented by a formula of Q$_1$, Q$_2$ or Q$_3$, or an azo pigment represented by a formula BA.

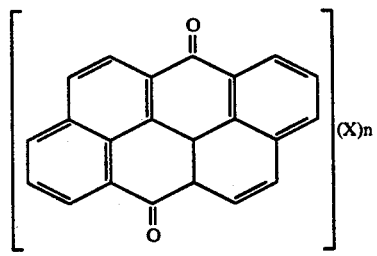

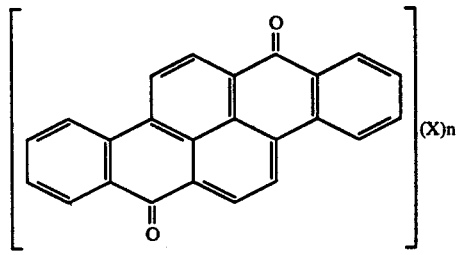

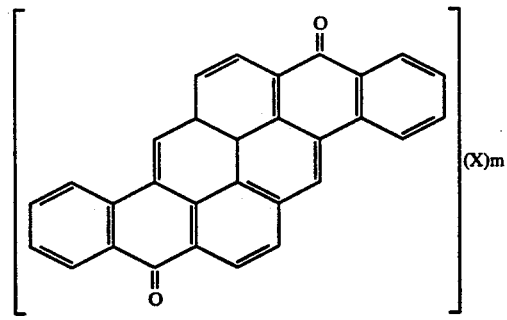

wherein X is a halogen atom, a nitro, cyano, acyl or carboxyl group, n is an integer of 0 to 4, and m is an integer of 0 to 6,

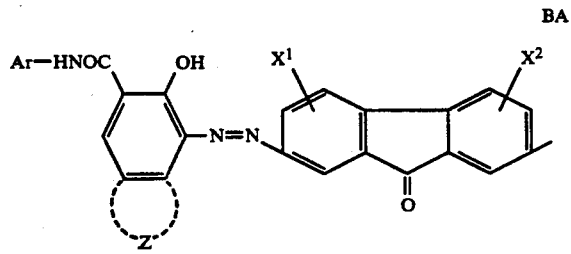

-continued

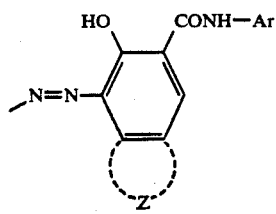

wherein $X_1$ and $X_2$ independently are a hydrogen atom or a halogen atom, provided that $X_1$ and $X_2$ are not simultaneously a hydrogen atom; Ar is an aromatic hydrocarbon ring having a fluorinated hydrocarbon group or an aromatic heterocyclic group having a fluorinated hydrocarbon group; Z is a group of non-metal atoms necessary to complete a substituted or unsubstituted aromatic heterocyclic group.

2. An electrophotographic photoreceptor according to claim 1, wherein the polycyclic quinone pigment is a compound represented by the formula $Q_1$.

3. An electrophotographic photoreceptor according to claim 1, wherein the Ar in the formula BA is an aryl group having a fluorinated hydrocarbon group.

4. An electrophotographic photoreceptor according to claim 3, wherein the Ar is a phenyl or naphthyl group having a fluorinated hydrocarbon group.

5. An electrophotographic photoreceptor according to claim 3, wherein the fluorinated hydrocarbon group is selected from a group consisting of trifluolomethyl, pentafluoroethyl, tetrafluoroethyl and heptafluoropropyl groups.

6. An electrophotographic photoreceptor according to claim 3, wherein the fluorinated hydrocarbon group is a trifluoromethyl group.

* * * * *